(12) United States Patent
Kobayashi

(10) Patent No.: US 10,121,154 B2
(45) Date of Patent: Nov. 6, 2018

(54) INFORMATION DISPLAY APPARATUS, DISTRIBUTION APPARATUS, INFORMATION DISPLAY METHOD, AND NON-TRANSITORY COMPUTER READABLE STORAGE MEDIUM

(71) Applicant: YAHOO JAPAN CORPORATION, Tokyo (JP)

(72) Inventor: Daisuke Kobayashi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 0 days.

(21) Appl. No.: 14/854,481

(22) Filed: Sep. 15, 2015

(65) Prior Publication Data

US 2016/0085423 A1   Mar. 24, 2016

(30) Foreign Application Priority Data

Sep. 19, 2014 (JP) ................. 2014-191812

(51) Int. Cl.
*G06F 3/0484* (2013.01)
*G06Q 30/02* (2012.01)

(52) U.S. Cl.
CPC ......... *G06Q 30/02* (2013.01); *G06F 3/04842* (2013.01); *G06F 3/04845* (2013.01)

(58) Field of Classification Search
None
See application file for complete search history.

(56) References Cited

U.S. PATENT DOCUMENTS

| 2007/0022389 | A1* | 1/2007 | Ording | G06F 3/0481 715/790 |
| 2008/0281689 | A1* | 11/2008 | Blinnikka | G06Q 30/0264 705/14.61 |
| 2009/0228919 | A1* | 9/2009 | Zott | H04N 7/17318 725/34 |
| 2011/0078625 | A1* | 3/2011 | Mumford | G06F 9/4443 715/804 |
| 2013/0166393 | A1* | 6/2013 | Lee | G06Q 30/0267 705/14.69 |
| 2014/0173480 | A1* | 6/2014 | Krane | G06F 3/04842 715/766 |
| 2015/0022683 | A1* | 1/2015 | Wang | H04N 5/4403 348/222.1 |

FOREIGN PATENT DOCUMENTS

| JP | 2013-061792 A | 4/2013 |
| JP | 2013-134770 A | 7/2013 |
| JP | 2014-049095 A | 3/2014 |
| JP | 2014-063224 A | 4/2014 |

OTHER PUBLICATIONS

Mar. 1, 2016 Office Action issued in Japanese Patent Application No. 2014-191812.

* cited by examiner

*Primary Examiner* — Tize Ma
(74) *Attorney, Agent, or Firm* — Oliff PLC

(57) ABSTRACT

An information display apparatus includes a display unit configured to display first content and a part of second content that is a moving image in an overlapping manner. The information display apparatus includes a change unit configured to change a displayed area of the second content while reproducing the second content in a case where an area in which the first content is displayed is selected by a user.

20 Claims, 8 Drawing Sheets

| ADVER-TISER ID | ADVERTISEMENT CONTENT | NUMBER OF IMPRESSIONS | IMPRESSION-GUARANTEED NUMBER | RE-WARD | ... |
|---|---|---|---|---|---|
| B10 | C20, CONTROL INSTRUCTION | 10000 | 20000 | aaa | ... |
| | C30, CONTROL INSTRUCTION | 5000 | 10000 | bbb | ... |
| | C40, CONTROL INSTRUCTION | 15000 | 20000 | ccc | ... |
| | ... | ... | ... | ... | ... |
| B20 | C50, CONTROL INSTRUCTION | 10000 | 20000 | ddd | ... |
| | C60, CONTROL INSTRUCTION | 5000 | 10000 | eee | ... |
| | ... | ... | ... | ... | ... |
| ... | ... | ... | ... | ... | ... |

INFORMATION DISPLAY APPARATUS, DISTRIBUTION APPARATUS, INFORMATION DISPLAY METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2014-191812 filed in Japan on Sep. 19, 2014.

BACKGROUND OF THE INVENTION

1. Field of the Invention

The present invention relates to an information display apparatus, a distribution apparatus, an information display method, and non-transitory computer readable storage medium.

2. Description of the Related Art

Conventionally, technologies for displaying various kinds of information on arbitrary information display apparatuses including a smart device such as a smartphone, a tablet personal computer (PC), a desktop PC, and the like are known. As an example of such technologies, a technology has been known which arouses interest in content by displaying predetermined content on a screen included in an information display apparatus and changing the display mode of the content in accordance with a user's operation. For example, a technology for displaying a web page and content other than the web page on a screen and increasing an area in which the content is displayed in a case where a user executes a scrolling operation of the web page has been known.

Patent Literature 1: Japanese Patent Application Laid-open No. 2014-049095

However, there are cases where the appeal of information relating to content is necessarily determined to be high. For example, in the related art, there are cases where, in a case where an operation of scrolling a web page is executed, the area in which the content is displayed is simply increased, but information relating to the content is not distributed to a user viewing the web page.

SUMMARY OF THE INVENTION

It is an object of the present invention to at least partially solve the problems in the conventional technology.

According to one aspect of an embodiment, an information display apparatus includes a display unit configured to display first content and a part of second content that is a moving image in an overlapping manner. The information display apparatus includes a change unit configured to change a displayed area of the second content while reproducing the second content in a case where an area in which the first content is displayed is selected by a user.

According to the other aspect of an embodiment, a distribution apparatus includes a distribution unit configured to distribute second content that is a moving image, which is displayed together with first content, to a terminal apparatus together with control information. The control information causing the terminal apparatus to execute displaying the first content and a part of the second content in an overlapping manner. The control information causing the terminal apparatus to execute changing a displayed area of the second content while reproducing the second content in a case where an area in which the first content is displayed is selected by a user.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments for executing an information display apparatus, a distribution apparatus, an information display method, and an information display program relating to this application (hereinafter, referred to as "embodiments") will be described in detail with reference to the drawings. However, the information display apparatus, the distribution apparatus, the information display method, and the information display program relating to this application are not limited to the embodiments. In the embodiments described below, the same reference sign is assigned to the same portion, and duplicate description thereof will not be presented.

1. Example of Terminal Apparatus 100

Figure 1:
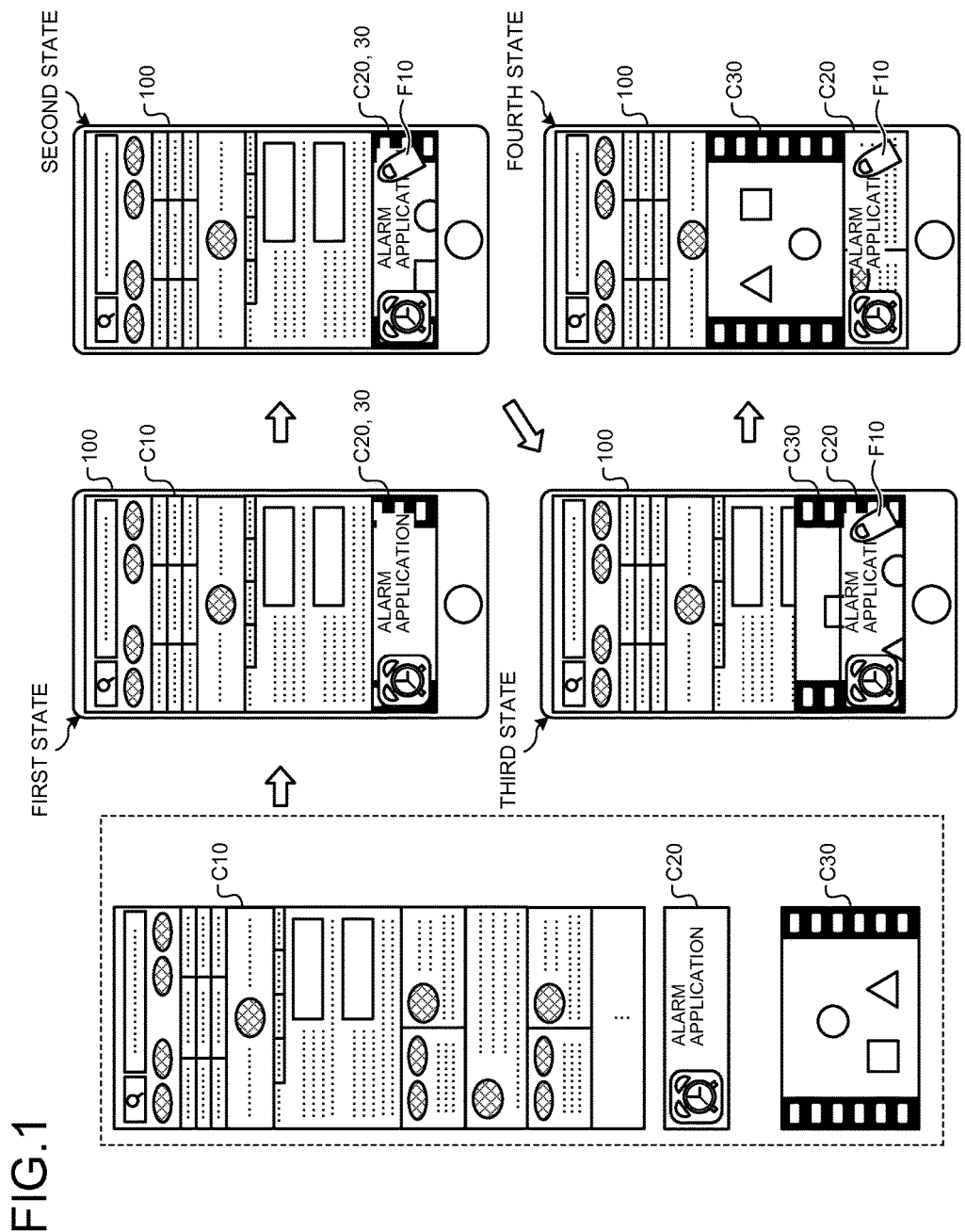
FIG. 1 is a diagram that illustrates an example of a terminal apparatus according to an embodiment.

First, an example of the process executed by a terminal apparatus 100 that is an example of an information processing apparatus will be described with reference to FIG. 1. FIG. 1 is a diagram that illustrates an example of a terminal apparatus according to an embodiment. FIG. 1 illustrates an example in which a web page C10 and content items C20 and C30 are displayed by the terminal apparatus 100.

The terminal apparatus 100 illustrated in FIG. 1 is a smart device such as a smartphone or a tablet and is a mobile terminal apparatus capable of communicating with an arbitrary server apparatus through a radio communication network such as 3 Generation (3G) or Long term Evolution (LTE). In addition, the terminal apparatus 100, as will be described later, includes an output unit 130 that includes a liquid crystal display and the like. In the terminal apparatus 100, a touch panel is assumed to be used. In other words, a user using the terminal apparatus 100 executes various operations by touching a display surface of the output unit 130 (hereinafter, it may be referred to as a screen) by using a finger or a dedicated pen.

The web page C10, for example, is a web page on which indexes and contents of news, weather forecasts, and received mails, a photo viewer, and the other various kinds of content are arranged and is a web page described using a hyper text markup language (HTML), an extensible markup language (XML), or the like. In the web page C10, an input field used for inputting a search keyword, a link to another web page, and the like are included. In description presented below, the web page C10 is assumed to be a web page of a so-called portal site. In addition, the web page C10 is a web page that is optimized for a smart device and is assumed to be a web page of which the horizontal display size is the same as the horizontal display size of the screen of the terminal apparatus 100. Furthermore, the web page C10 is assumed to be a web page of which the vertical display size is longer than the vertical display size of an output unit 130 included in the terminal apparatus 100.

In addition, it may be configured such that the web page C10 has content items which are arranged in independent tile shapes, and an operation, an update, and the like can be executed for each of the content items arranged in the tile shapes. Here, the size and the arrangement position of each tile arranged on the web page C10 may be configured to be automatically changed for each tile or may be configured to be changed in accordance with a user's operation.

For example, on the web page C10, news topics itemized under display of "latest news" and "news list" are displayed. Each relating news topic corresponds to an anchor text linked to another web page. In addition, for example, on the web page C10, texts or buttons to which links to web pages providing various services such as "routes", "auction", and "shopping" are set may be arranged.

While the terminal apparatus 100 displays content items C20 and C30 to be described later together with the web page C10, the terminal apparatus 100 may display the content items C20 and C30 together with arbitrary content such as a game instead of the web page C10. In other words, the terminal apparatus 100 is assumed to be able to display the content items C20 and C30 together with arbitrary content, which is realized by an arbitrary application, other than the web page C10.

The content C20 is content that is displayed together with the web page C10 and, for example, is content relating to an advertisement. For example, the content C20 is so-called banner content and is content displayed to overlap the web page C10. In the example illustrated in FIG. 1, the content C20 is content relating to an advertisement of an application realizing an alarm function and an area in which an icon of a clock is arranged and a name of an advertisement target that is "alarm application" or the like are arranged.

Here, in the content C20, an area other than the area to which an icon or characters are attached is a transmissive area that projects content arranged on the back face. In description presented below, while the content C20 is assumed to have a transmissive area that applies a predetermined color to content arranged on the back face and transmits the content, the embodiment is not limited thereto.

The content C30 is content that is displayed together with the web page C10 and, for example, is a moving image. Here, in the moving image included in the content C30, information relating to an advertisement target that is the same as that of the content C20 is assumed to be included. In other words, the content items C20 and C30 are content items relating to each other. For example, in the content C20, information relating to information relating to the content C30 such as the name of an advertisement target relating to the content C30 or the like is arranged. In addition, a moving image relating to the advertisement target represented by the icon or the name of the advertisement target arranged in the content C20 is displayed as the content C30. However, the embodiment is not limited thereto. In other words, the content C20 and the content C30 may be either content relating to the same advertisement or mutually-different independent content items.

In addition, in the example illustrated in FIG. 1, the horizontal display size of the web page C10, the horizontal display size of the content C20, and the horizontal display size of the content C30 are assumed to be the same size. For example, the horizontal display sizes of the web page C10 and the content items C20 and C30 are assumed to be the same size as that of the horizontal width of the screen of the terminal apparatus 100.

Here, the content items C20 and C30 are not limited to the forms illustrated in FIG. 1. For example, the content items C20 and C30 are assumed to be not only advertisements relating to promotions relating to products or services relating to the content items C20 and C30 but also recruitment of volunteers, public service advertisements, notifications to the public, moving images, still images, or any other arbitrary content. In other words, as each of the content items C20 and C30, characters, a diagram, a symbol, a hyperlink, or any other arbitrary content may be applied as long as it causes user's interest and widely delivers information included in such content or information relating to another content (for example, a landing page or the like) relating to related content.

In addition, the content items C20 and C30 may not be content items relating to advertisements. For example, when game content is displayed instead of the web page C10, the terminal apparatus 100 may display auxiliary content items such as the menus or tutorials of games as the web content items C20 and C30. In other words, the content items C20 and C30 may be content items that depend on main content like the web page C10 or content items not depending on the related content.

2-1. Process Executed by Terminal Apparatus 100

Here, when an operation of scrolling a web page is executed, a conventional terminal apparatus 100 enlarges an area in which predetermined content is displayed. However, according to such a conventional technology, only the area in which content is displayed is increased, and there are cases where information relating to the content is not delivered to a user viewing the web page.

Thus, the terminal apparatus 100 executes a display changing process as below. First, the terminal apparatus 100 displays the web page C10 and displays the content C20 and a part of the content C30 to overlap each other. Then, in a case where an area in which the content C20 is displayed is selected by a user, the terminal apparatus 100 changes the area of the content C30 that is displayed on the screen while reproducing the content C30.

For example, in a case where the distribution of the web page C10 and the content items C20 and C30 is received, the terminal apparatus 100 arranges the content C20 at the lower end of the screen of the terminal apparatus 100 and arranges the content C30 at the back face of the content C20. Here, the terminal apparatus 100 arranges the content C30 such that an area of the content C30 that has the same display size as that of the content C20 is displayed on the screen. In addition, the terminal apparatus 100 arranges the displayed area of the content C30 on the back face of the content C20.

Then, the terminal apparatus 100 arranges the web page C10 on the back faces of the content items C20 and C30, displays the web page C10 and the content items C20 and C30, and starts to reproduce the content C30. As a result, in the terminal apparatus 100, the content items C20 and C30 are displayed in a complicated form in which a part of the upper side of the content C30 is arranged on the back face of the content C20, and a moving image of the content C30 arranged on the back face is reproduced through a transmissive area of the content C20. In description presented below, such display forms of the content items C20 and C30 will be described as an initial state.

In addition, in a case where the display area of the content C20 is selected by the user, the terminal apparatus 100 enlarges the area of the display area of the content C30 while reproducing the content C30. For example, when the display area of the content C20 is selected by the user, the terminal apparatus 100 enlarges the area of the display area of the content C30 by gradually moving the content C30 in the upward direction on the screen during such a selection. Then, when the content C30 is moved up to screen information from than the content C20, in other words, when the entire content C30 is displayed not to overlap the content C20, the terminal apparatus 100 stops the movement of the content C30.

In addition, in a case where a user's finger is separated from the screen, in other words, in a case where the selection of the content C20 is released, the terminal apparatus 100 gradually moves the content C30 up to a position at which the entire area of the content C30 displayed inside the screen is arranged on the back face of the content C20. For example, in a case where the user's finger is separated from the screen, the terminal apparatus 100 moves the content C30 such that the area of the content C30 displayed inside the screen is the same as the area of the display size of the content C20, thereby returning the display forms of the content items C20 and C30 to the initial state.

Here, links to predetermined web pages (so-called landing pages) may be set to the content items C20 and C30. In other others, each of the content items C20 and C30 may be content that can transit to a predetermined landing page when the content is selected by the user. For example, in a case where the area in which the icon of the watch is arranged is selected from among the content C20, the terminal apparatus 100 may display the landing page set to the content C20. In addition, when a moving image included in the content C30 is reproduced up to the end, the terminal apparatus 100 may display a landing page set to the content C30. Furthermore, the terminal apparatus 100 may display the content C30 in which an image to which a link to a predetermined landing page is set is displayed at the end of the moving image and display the landing page when such an image is selected by the user.

In this way, the terminal apparatus 100 arranges and displays a part of the content C30, which is a moving image, on the back face of the content C20. For this reason, the terminal apparatus 100, for example, displays the content items C20 and C30 in a complicated form in which only a part of the moving image is reproduced through the transmissive area of the content C20. For this reason, the terminal apparatus 100 can arouse interest in information relating to the content items C20 and C30.

In addition, in a case where the content C20 is selected by the user, the terminal apparatus 100 changes the area of the content C30 that is displayed on the screen while reproducing the moving image. For example, the terminal apparatus 100 enlarges the area of the content C30 that is displayed on the screen. For this reason, the terminal apparatus 100 can impress the user with the information relating to the content items C20 and C30, and consequently, an appeal of the information relating to the content items C20 and C30 can be improved.

2-2. Example of Display Changing Process

Hereinafter, an example of the display changing process executed by the terminal apparatus 100 will be described with reference to FIG. 1. In the description presented below, the example of the display changing process executed by the terminal apparatus 100 will be described by dividing the states into first to fourth states.

First, the terminal apparatus 100 receives distribution of a web page C10 and content items C20 and C30. In such a case, the terminal apparatus 100 displays the web page C10 and arranges the content C20 at the lower end of the screen. In addition, the terminal apparatus 100 arranges an area of the content C30 that has the same display size as that of the content C20 on the back face of the content C20. Then, the terminal apparatus 100 reproduces the content C30 together with displaying the web page C10 and the content items C20 and C30.

As a result, as illustrated in the first state represented in FIG. 1, the terminal apparatus 100 displays the web page C10 and displays the content items C20 and C30 in a complicated form in which the content C30 is displayed while being reproduced through the transmissive area of the content C20. In addition, when a scrolling operation is executed in an area in which the web page C10 is displayed, the terminal apparatus 100 scrolls only the web page C10.

Here, as illustrated in the second state represented in FIG. 1, in a case where a user's finger F10 selects the content C20, the terminal apparatus 100 executes the display changing process. In other words, the terminal apparatus 100 moves the content C30 in the upward direction on the screen while reproducing the content C30, whereby an area of the content C30 that is displayed inside the screen is gradually enlarged.

As a result, as illustrated in the third state represented in FIG. 1, the terminal apparatus 100 displays the content items C20 and C30 in a complicated form in which a range of the content C30 that is larger than the display size of the content C20 is displayed inside the screen, and a part of such a range overlaps the content C20. In addition, while the content C20 is continuously selected by the user's finger F10, the terminal apparatus 100 moves the content C30 while reproducing it, thereby gradually enlarging the area of the content C30 that is displayed inside the screen.

Then, until the entire content C30 is arranged inside the screen, and an overlapping area between the content C20 and the content C30 disappear, the terminal apparatus 100 moves the content C30 while reproducing the content C30.

As a result, as illustrated in the fourth state represented in FIG. 1, the terminal apparatus 100 displays the content C20 and the content C30 not to overlap each other.

Here, in a case where the user's finger F10 is separated from the screen, in other words, in a case where the selection of the content C20 is released, the terminal apparatus 100 gradually moves the content C30 in a downward direction on the screen while reproducing the content C30. Then, when the display size of the area of the content C30 that is displayed inside the screen is the same as the display size of the content C20, the terminal apparatus 100 ends the movement of the content C30. As a result, the terminal apparatus 100, for example, displays the content items C20 and C30 in the display form illustrated in the first state from the fourth state illustrated in FIG. 1 through the third state and the second state.

In the example described above, the terminal apparatus 100 executes the display changing process while reproducing the content C30. Here, when the content C30 is reproduced up to the end, the terminal apparatus 100 may reproduce the content C30 from the start again. In addition, for example, in a case where the area of the content C30 that is displayed inside the screen is not enlarged, the terminal apparatus 100 may not reproduce the content C30. In such a case, the terminal apparatus 100 may start the reproduction of the content C30 when the content C20 is selected, and the area of the content C30 that is displayed inside the screen is started to be enlarged.

In addition, the terminal apparatus 100 may start the reproduction of the content C30 when the area of the content C30 that is displayed inside the screen exceeds a predetermined threshold. Furthermore, in a case where the entire content C30 is displayed, and the content C20 and the content C30 overlap each other, the terminal apparatus 100 may reproduce the moving image of the content C30 from the start again.

Furthermore, in the first state, the terminal apparatus 100 may set the width of the area of the content C30 that is displayed on the screen to be narrower than the display size of the content C20. In other words, in the initial state, the terminal apparatus 100 may display the content C30 of an arbitrary width as long as the entire area of the content C30 that is displayed on the screen is arranged on the back face of the content C20.

2-3. Execution Subject

While description has not been presented above, the terminal apparatus 100 may realize the above-described process by using an arbitrary technique. For example, the terminal apparatus 100 may realize the above-described process by downloading an application causing the terminal apparatus 100 to execute the above-described display changing process in advance and executing the application at arbitrary timing.

In addition, when a game or an application reproducing arbitrary content is executed, the terminal apparatus 100 may receive distribution of control information used for executing the above-described display changing process together with the distribution of the content items C20 and C30 and execute the above-described display changing process based on such control information. Furthermore, the terminal apparatus 100 receives the distribution of the control information used for executing the above-described display changing process simultaneously with the distribution of the web page C10 and the content items C20 and C30 and executes the above-described display changing process.

Hereinafter, the terminal apparatus 100 and the like executing the above-described display changing process based on the control information will be described. In the description presented below, while an example will be described in which content C20 relating to an advertisement is distributed as an example of the content items C20 and C30, the embodiment is not limited thereto. In other words, the content items C20 and C30 are not limited to content relating to advertisements. In addition, in the description presented below, content relating to advertisements such as the content items C20 and C30 will be described as advertisement content.

Furthermore, in the description presented above, while an example will be described in which the terminal apparatus 100 displays the content items C20 and C30 together with the web page C10, the embodiment is not limited thereto. In other words, the terminal apparatus 100 may execute the above-described display changing process by displaying the content items C20 and C30 together with a game, content of a social network service (SNS), or the screen of a messenger application, the screen of a camera application, or any other arbitrary content instead of the web page C10.

3. Configuration of Distribution System

Figure 2:
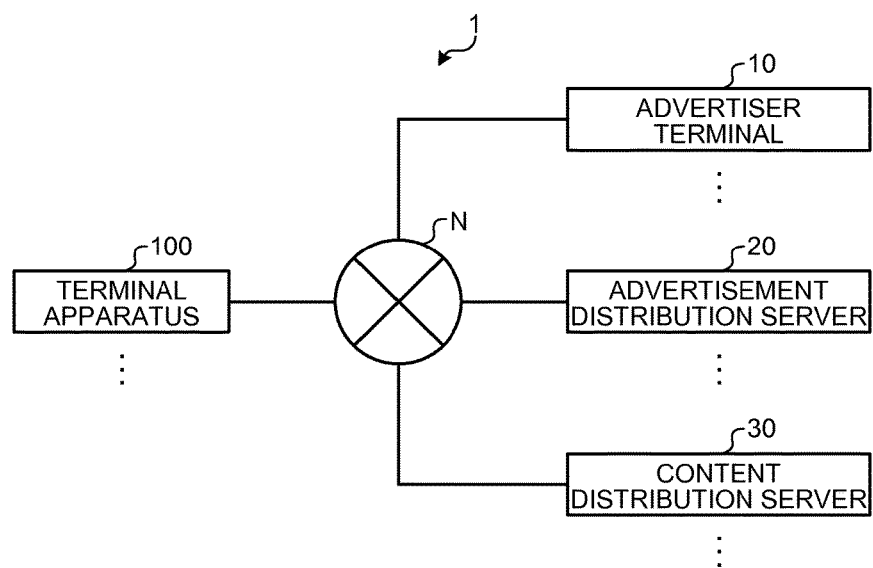
FIG. 2 is a diagram that illustrates an example of the configuration of a distribution system according to an embodiment.

Hereinafter, the terminal apparatus 100 and the like realizing the above-described display process will be described. First, the configuration of a distribution system 1 according to an embodiment will be described with reference to FIG. 2. FIG. 2 is a diagram that illustrates an example of the configuration of a distribution system according to an embodiment. As illustrated in FIG. 2, the distribution system 1 includes: a terminal apparatus 100; an advertiser terminal 10; an advertisement distribution server 20; and a content distribution server 30. The terminal apparatus 100, the advertiser terminal 10, the advertisement distribution server 20, and the content distribution server 30 are interconnected to be communicable with each other in a wired or wireless manner through a network N. In the distribution system 1 illustrated in FIG. 2, a plurality of terminal apparatuses 100, a plurality of advertiser terminals 10, a plurality of advertisement distribution servers 20, or a plurality of content distribution servers 30 may be included.

The terminal apparatus 100 is an information processing apparatus that is used by a user reading a web page. For example, the terminal apparatus 100 is a mobile phone such as a smartphone, a tablet terminal, a personal digital assistance (PDA), a desktop personal computer (PC), a notebook PC, or the like. The terminal apparatus 100 acquires a web page C10 from the content distribution server 30 according to a user's operation and displays the acquired web page C10. In addition, in a case where an acquisition command to be described later is included together with the web page C10, the terminal apparatus 100 acquires content items C20 and C30 from the advertisement distribution server 20 and displays the acquired content items C20 and C30 together with the web page C10.

The advertiser terminal 10 is an information processing apparatus that is used by an advertiser. For example, the advertiser terminal 10 is a desk top PC, a notebook PC, a tablet terminal, a mobile phone, a PDA, or the like. The advertiser terminal 10 submits the content C20 to the advertisement distribution server 20 as advertisement content according to an advertiser's operation. For example, the advertiser terminal 10 submits a still image, a moving image, text data, a uniform resource locator (URL) used for acquiring a landing page, or the like to the advertisement distribution server 20 as the advertisement content.

In addition, there are cases where the advertiser requests an agent to submit advertisement content. In such cases, the agent submits the advertisement content to the advertisement distribution server 20. Hereinafter, an "advertiser" has a concept including not only an advertiser but also an agent, and an "advertiser terminal" has a concept including not only the advertiser terminal 10 but also an agent apparatus that is used by the agent.

The advertisement distribution server 20 is a server apparatus that distributes advertisement content submitted from the advertiser terminal 10. For example, when a request for distributing advertisement content is received from the terminal apparatus 100, the advertisement distribution server 20 matches a user and advertisement content based on the location of the terminal apparatus 100, the attributes of the user, and the like and distributes advertisement content that is a distribution target as a result of the matching process to the terminal apparatus 100. In addition, the advertisement distribution server 20 distributes control information used for giving an instruction for the display form of the advertisement content that is the distribution target to the terminal apparatus 100 together with the advertisement content. The control information, for example, is described using a script language such as Java Script (registered trademark) or cascading style sheets (CSS).

The content distribution server 30 is a web server that distributes the web page C10 to the terminal apparatus 100 or the like. For example, the content distribution server 30 distributes the web page C10 that is a portal site at which various kinds of information relating to a portal site, a news site, an auction site, a weather forecast site, a shopping site, a finance (stock price) site, a route searching site, a map providing site, a travel site, a restaurant guide site, or a web blog are arranged to the terminal apparatus 100. Here, the content distribution server 30 may be a server that transmits a web page on which various kinds of information are arranged in tile shapes and for which update or the like of information is executed for each tile to the terminal apparatus 100.

Here, in the web page C10 distributed by the content distribution server 30, an acquisition command is included. For example, in an HTML file or the like forming the web page C10, a URL of the advertisement distribution server 20 or the like is described as the acquisition command. In such a case, the terminal apparatus 100 accesses the URL described in the HTML file or the like, thereby acquiring the content items C20 and C30 from the advertisement distribution server 20 as advertisement content.

In addition, while various kinds of data distributed from the content distribution server 30 to the terminal apparatus 100 are actually an HTML file and an image forming a web page, a moving image displayed to overlap the web page, and the like, hereinafter, various kinds of data distributed from the content distribution server 30 to the terminal apparatus 100 may be referred to as web content.

4. Configuration of Advertisement Distribution Server

Figure 3:
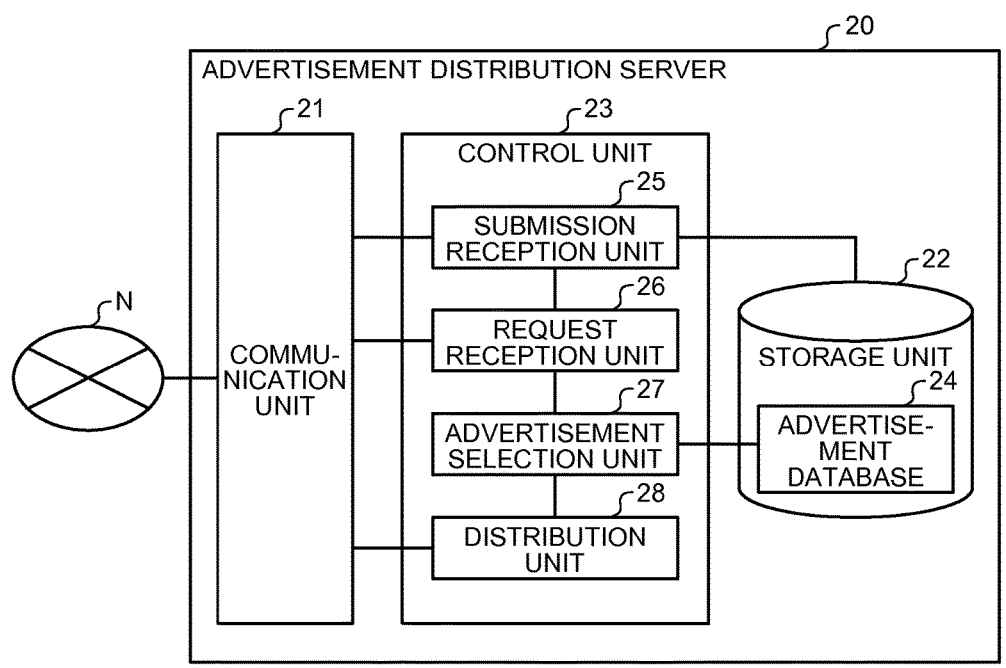
FIG. 3 is a diagram that illustrates an example of the configuration of an advertisement distribution server according to an embodiment.

Next, the configuration of the advertisement distribution server 20 according to an embodiment will be described with reference to FIG. 3. FIG. 3 is a diagram that illustrates an example of the configuration of the advertisement distribution server according to an embodiment. As illustrated in FIG. 3, the advertisement distribution server 20 includes: a communication unit 21; a storage unit 22; and a control unit 23.

The communication unit 21, for example, is realized by a network interface card (NIC) or the like. The communication unit 21 is connected to the network N in a wired or wireless manner and transmits/receives information to/from the terminal apparatus 100, the advertiser terminal 10, and the content distribution server 30.

The storage unit 22, for example, is realized by a semiconductor memory device such as random access memory (RAM) or flash memory or a storage device such as a hard disk or an optical disc. In addition, the storage unit 22 stores an advertisement database 24 that is a database in which various kinds of information relating to advertisement content submitted from the advertiser terminal 10 are stored.

Figures 4, 5:
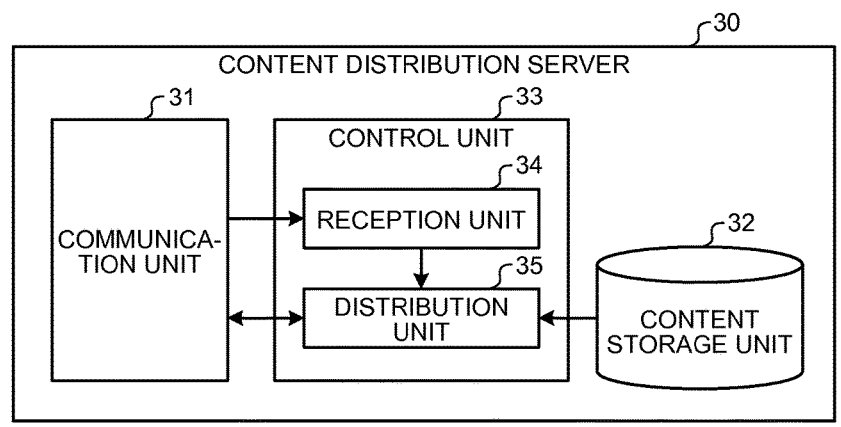
FIG. 4 is a diagram that illustrates an example of information stored in an advertisement database according to an embodiment.
FIG. 5 is a diagram that illustrates an example of the configuration of a content distribution server according to an embodiment.

Here, FIG. 4 is a diagram that illustrates an example of information stored in the advertisement database according to an embodiment. In the example illustrated in FIG. 4, the advertisement database 24 includes entries of an advertiser ID, advertisement content, the number of impressions, an impression-guaranteed number, and a reward. In addition, the advertisement database 24 may further store information used for matching content and a user and information called a click through rate (CTR).

The "advertiser ID" represents identification information used for identifying an advertiser or an advertiser terminal 10. The "advertisement content" represents content submitted from the advertiser terminal 10, in other words, content relating to an advertisement. In FIG. 4, while an example is illustrated in which conceptual information such as "C20" to "C60" is stored as "advertisement content", actually, arbitrary content including an audio such as a moving image including an audio, an audio and an image, an audio and text data, and an advertisement in the form of a game including an audio, or the like, a URL at which such content is present or a file path name representing such a storage location, and the like are stored therein.

The "number of impressions" represents the number of times of displaying advertisement content. In addition, the "impression guaranteed number" represents the number of times of displaying advertisement content that is guaranteed for a reward. Furthermore, the "reward" represents a reward that is paid from the advertiser when the advertisement content is displayed in correspondence with the "impression-guaranteed number". In other words, the advertisement distribution server 20 is a server that distributes content relating to an advertisement as an impression-guaranteed type.

In other words, FIG. 4 illustrates an example in which an advertiser identified by an advertiser ID "B10" submits content items C20 to C40 as advertisement content. In addition, FIG. 4 illustrates an example in which the number of impressions of the advertisement content "C20" is "10000", the impression-guaranteed number is "20000", and a charged amount that is charged when the content "C20" is displayed in correspondence with the impression guaranteed number is "aaa".

In addition, in the example illustrated in FIG. 4, an example is represented in which the number of impressions of the content C20 and the number of impressions of the content C30 are individually acquired. However, the embodiment is not limited thereto. For example, in the advertisement database 24, in a case where the impression-guaranteed number is set for a set of the content C20 and the content C30, the number of impressions, the impression-guaranteed number, the reward, and the like are registered for the set of the content C20 and the content C30.

Here, in the advertisement database 24, a control instruction used for giving an instruction for a display form in which each of content is displayed as the advertisement content is registered. For example, in the control instruction registered together with the content C20, information relating to the position at which the content C20 is arranged, whether or not the display changing process is executed, a position inside the screen at which the content C20 is arranged in a case where the display changing process is executed, content to be arranged on the back face of the content C20, a condition under which the display changing process is started, the URL of a landing page, and the like is assumed to be included. In addition, in the control instruction registered together with the content C30, information relating to timing at which reproduction is executed when the display changing process is executed, the back face of content on which the content is arranged, a range to be displayed when the content C30 is reproduced, whether or not reproduction is repeated, the URL of a landing page, and the like is assumed to be included.

In a case where content relating to an advertisement is distributed in a pay per click advertisement form for charging when the advertisement content is selected, in the advertisement database 24, the number of times of selecting the content, a charged amount when the content is selected, and the like are registered. In addition, in a case where, when a distribution request is received, advertisement content is selected in a bidding form, and the selected advertisement content is distributed, a bidding price, a CTR, or the like that is set by an advertiser as a reward per one impression is registered in the advertisement database 24.

Referring back to FIG. 3, the description will be continued. The control unit 23, for example, is realized by executing various programs stored in an internal storage device of the advertisement distribution server 20 by using a central processing unit (CPU), a micro processing unit (MPU), or the like with the RAM being used as a work area. In addition, the control unit 23, for example, is realized by an integrated circuit such as an application specific integrated circuit (ASIC) or a field programmable gate array (FPGA).

As illustrated in FIG. 3, the control unit 23 includes a submission reception unit 25, a request reception unit 26, an advertisement selection unit 27, and a distribution unit 28 and realizes or executes the function or the action of information processing to be described below. Here, the internal configuration of the control unit 23 is not limited to the configuration illustrated in FIG. 3, but any other configuration that is a configuration for executing the information processing to be described later may be employed. In addition, the connection relation of the processors included in the control unit 23 is not limited to the connection relation illustrated in FIG. 3 but may be any other connection relation.

The submission reception unit 25 receives a submission of advertisement content from the advertiser terminal 10. More specifically, the submission reception unit 25 receives a submission of advertisement content (in other words, the content items C20 and C30) together with designation of a bidding price. In addition, the submission reception unit 25 receives a control instruction. In such a case, the submission reception unit 25 registers the advertisement content, a control instruction, and an advertiser ID in the advertisement database 24. In addition, the submission reception unit 25 registers an impression-guaranteed number, a reward, and the like in accordance with the registration from the advertiser terminal 10 or settings, which are made by a service provider, provided by the distribution system 1.

The request reception unit 26 receives a request for acquiring advertisement content from the terminal apparatus 100. For example, the request reception unit 26 receives an HTTP request as the request for acquiring advertisement content.

In a case where a request for acquiring advertisement content is received by the request reception unit 26, the advertisement selection unit 27 selects advertisement content that is distribution candidate from the advertisement database 24. For example, based on the location of the terminal apparatus 100 and the attributes of the user, the advertisement selection unit 27 executes matching of advertisement content, which is a distribution target, from advertisement content registered in the advertisement database 24. In such a matching process, advertisement content is selected such that the number of impressions is larger than the impression-guaranteed number. For example, the advertisement selection unit 27 selects advertisement content for which a difference between the impression-guaranteed number and the number of impressions is largest with priority. In addition, the advertisement selection unit 27 may select advertisement content for which the bidding price or the CTR is high or advertisement content for which both the bidding price and the CTR are high with priority. Then, the advertisement selection unit 27 outputs advertisement content selected as the distribution target to the distribution unit 28.

In a case where the web page is a search page, the advertisement selection unit 27 may use an advertisement distribution technique called a search advertising extracting advertisement content matching a search keyword designated on the search page. In addition, the advertisement selection unit 27 may use an advertisement distribution technique called a targeted distribution extracting advertisement content matching the attribute information (psychographic attributes, demographic attributes, or the like) of the user.

In addition, in a case where an instruction for displaying the content C30 by arranging the content on the back face is included in the control instruction of the content C20 that is the distribution target, the advertisement selection unit 27 reads the content C30 from the advertisement database 24 and outputs the content items C20 and C30 to the distribution unit 28.

The distribution unit 28 distributes control information to the terminal apparatus 100 together with the advertisement content selected by the advertisement selection unit 27. More specifically, when the advertisement content selected by the advertisement selection unit 27 is received, the distribution unit 28 extracts a control instruction included in the received advertisement content. Then, the distribution unit 28 generates control information used for causing the terminal apparatus 100 to execute the display changing process of content represented by the extracted control instruction. Thereafter, the distribution unit 28 distributes the generated control information and the advertisement content to the terminal apparatus 100.

5. Configuration of Content Distribution Server

Next, the configuration of the content distribution server 30 according to an embodiment will be described with reference to FIG. 5. FIG. 5 is a diagram that illustrates an example of the configuration of the content distribution server according to an embodiment. As illustrated in FIG. 5, the content distribution server 30 includes: a communication unit 31; a content storage unit 32; and a control unit 33.

The communication unit 31, for example, is realized by an NIC or the like. The communication unit 31 is connected to the network N in a wired or wireless manner and transmits/receives information to/from the terminal apparatus 100 and the advertisement distribution server 20.

The content storage unit 32, for example, is realized by a semiconductor memory device such as RAM or flash memory or a storage device such as a hard disk or an optical disc. The content storage unit 32 stores a web page that is an example of the content. For example, the content storage unit 32 stores an HTML file forming a web page and a still image and a moving image displayed on the web page.

The control unit 33, for example, is realized by executing various programs (corresponding to an example of a distribution program) stored in an internal storage device of the content distribution server 30 by using a CPU, an MPU, or the like with the RAM being used as a work area. In addition, the control unit 33, for example, is realized by an integrated circuit such as an ASIC or an FPGA.

As illustrated in FIG. 5, the control unit 33 includes a reception unit 34 and a distribution unit 35 and realizes or executes the function or the reaction of the information processing to be described below. However, the internal configuration of the control unit 33 is not limited to the configuration illustrated in FIG. 5, but any other configuration for executing the information processing to be described later may be employed. In addition, the connection relation of the processors included in the control unit 33 is not limited to the connection relation illustrated in FIG. 5 but may be any other connection relation.

The reception unit 34 receives a request for acquiring a web page from the terminal apparatus 100. For example, the reception unit 34 receives an HTTP request as the request for acquiring a web page.

In a case where a request for acquiring a web page is received by the reception unit 34, the distribution unit 35 distributes a web page to the terminal apparatus 100. More specifically, the distribution unit 35 acquires a web page that is an acquisition request target from the content storage unit 32 and distributes the acquired web page to the terminal apparatus 100. In such a case, when the web page C10 is received, the terminal apparatus 100 transmits a request for distributing an advertisement to the advertisement distribution server 20 and displays advertisement content received as a response in accordance with the display changing process.

6. Configuration of Terminal Apparatus

Figure 6:
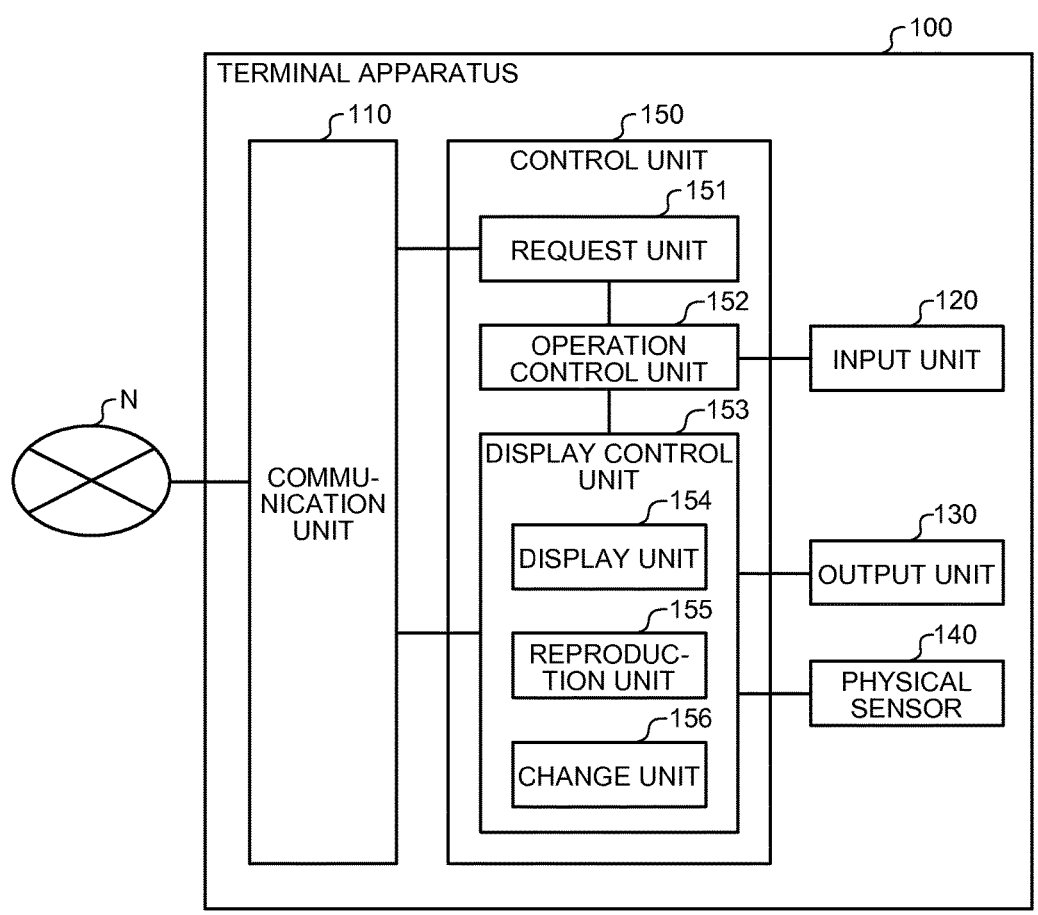
FIG. 6 is a diagram that illustrates an example of the configuration of a terminal apparatus according to an embodiment.

Next, the configuration of the terminal apparatus 100 according to an embodiment will be described with reference to FIG. 6. FIG. 6 is a diagram that illustrates an example of the configuration of the terminal apparatus according to an embodiment. As illustrated in FIG. 6, the terminal apparatus 100 includes: a communication unit 110; an input unit 120; an output unit 130; a physical sensor 140; and a control unit 150.

The communication unit 110, for example, is realized by an NIC or the like. The communication unit 110 is connected to the network N in a wired or wireless manner and transmits/receives information to/from the advertisement distribution server 20 and the content distribution server 30.

The input unit 120 is an input device that receives various operations from a user. For example, the input unit 120 is realized by a keyboard, a mouse, an operation key, or the like. The output unit 130 is a display device used for displaying various kinds of information. For example, the output unit 130 is realized by a liquid crystal display or the like. In addition, in a case where a touch panel is employed by the terminal apparatus 100, the input unit 120 and the output unit 130 are integrated together.

The physical sensor 140 is a sensor that detects a physical state of the terminal apparatus 100. For example, the physical sensor 140 is a gyro sensor that measures inclinations of the terminal apparatus 100 in three axial directions. The physical sensor 140 is not limited to the gyro sensor, but an arbitrary sensor such as an acceleration sensor, a temperature sensor, a volume sensor, or a brightness sensor can be applied.

The control unit 150, for example, is realized by executing various programs (corresponding to an example of a display program) stored in an internal storage device of the terminal apparatus 100 by using a CPU, an MPU, or the like with the RAM being used as a work area. For example, the various programs correspond to an application program that is called as a web browser. In addition, the control unit 150, for example, is realized by an integrated circuit such as an ASIC or an FPGA.

As illustrated in FIG. 6, the control unit 150 includes a request unit 151, an operation control unit 152, and a display control unit 153 and realizes or executes the function or the reaction of the information processing to be described below. However, the internal configuration of the control unit 150 is not limited to the configuration illustrated in FIG. 6, but any other configuration for executing the information processing to be described later may be employed. In addition, the connection relation of the processors included in the control unit 150 is not limited to the connection relation illustrated in FIG. 6 but may be any other connection relation.

In a case where the URL of the web page C10 is received from the operation control unit 152, the request unit 151 transmits a request for acquiring the web page C10 represented by the received URL to the content distribution server 30. In addition, in a case where an acquisition command is included in the web page received from the content distribution server 30, the request unit 151 transmits a request for acquiring advertisement content to the advertisement distribution server 20.

The operation control unit 152 executes various control operations in accordance with a user's operation received through the input unit 120. For example, in a case where the user executes an operation of displaying the web page C10 for the input unit 120, the operation control unit 152 outputs the URL of the web page C10 that is a display target to the request unit 151. In addition, the operation control unit 152 outputs the content of the user's operation received through the input unit 120 to the display control unit 153.

For example, in a case where the user's finger F10 moves with being in contact with the screen in an area in which the web page C10 is displayed, the operation control unit 152 determines that an operation of scrolling the web page C10 is executed and notifies the display control unit 153 of a direction in which the finger F10 moves, in other words, the direction of the scrolling and the amount of movement of the finger, in other words, the amount to be scrolled.

On the other hand, in a case where the user's finger F10 is brought into contact with the area in which the content C20 is displayed, the operation control unit 152 notifies the display control unit 153 of a selection of the content C20. In addition, in a case where the user's finger F10 is separated from the area in which the content C20 is displayed, the operation control unit 152 notifies the display control unit 153 of the release of the selection.

The display control unit 153 displays the web page and the advertisement content, which have been received, on the output unit 130 and executes the above-described display changing process. For example, as the control unit 150 executes control information distributed together with the advertisement content, the display control unit 153, as illustrated in FIG. 6, operates as a display unit 154, a reproduction unit 155, and a change unit 156, thereby executing the display changing process. The display unit 154, the reproduction unit 155, and the change unit 156 are realized, for example, by a CPU, an MPU, or the like by executing the control information with the RAM being used as a work area.

The display unit 154 displays the content C20 and a part of the content C30 that is a moving image C30 in an overlapping manner. More specifically, the display unit 154 arranges the content C30 such that a part of the area of the content C30 is displayed inside the screen. As a more detailed example, the display unit 154 arranges the content C30 such that a range of the area of the content C30 that is the same as the display size of the content C20 is displayed inside the screen.

In addition, the display unit 154 arranges the content C20 having a transmissive area on the front face of the range of the content C30 that is displayed inside the screen. Then, the display unit 154 arranges the web page C10 on the back faces of the content items C20 and C30, thereby displaying the web page C10 and the content items C20 and C30. As a result, the display unit 154 displays a part of the content C30 to overlap the front face of the web page C10, and the content C20 having the transmissive area on the front face of the content C30 is displayed in an overlapping manner.

Here, the display unit 154 reproduces the moving image of the content C30 under the control of the reproduction unit 155 to be described later. For this reason, the display unit 154 can display the content items C20 and C30 in a complicated form in which a part of the reproduced moving image is displayed through the transmissive area of the content C20.

In addition, the display unit 154 changes the area of the content C30 that is displayed inside the screen under the control of the change unit 156 to be described later. For example, the display unit 154 moves the content C30 to the inside of the screen, thereby enlarging the area of the content C30 that is displayed inside the screen. On the other hand, the display unit 154 moves the content C30 to the outside of the screen, thereby reducing the area of the content C30 that is displayed inside the screen.

Furthermore, in a case where an icon arranged in the content C20 is selected by the user, the display unit 154 displays a landing page set to the content C20. In addition, when the entire content C30 is arranged inside the screen, in a case where the reproduction of the content C30 ends or in a case where an image displayed at the end of the content C30 is selected by the user, the display unit 154 displays a landing page set to the content C30.

The reproduction unit 155 controls the reproduction of the content C30. For example, the reproduction unit 155 starts to reproduce the content C30 at timing set by the advertiser as a control instruction. For example, in a case where the content C30 is displayed, a case where the displayed area of the content C30 exceeds a predetermined threshold, or the like, the reproduction unit 155 starts to reproduce the content C30. In addition, in a case where the moving image of the content C30 is reproduced to the end, the reproduction unit 155 repeats the reproduction from the start of the moving image.

In addition, the reproduction unit 155 may control the reproduction of the content C30 in accordance with a user's operation. For example, in a case where the content C20 is selected by the user, the reproduction unit 155 may start to reproduce the content C30. In addition, in a case where the entire content C30 is displayed, and the content C20 and the content C30 do not overlap each other, the reproduction unit 155 may reproduce the content C30 from the start again.

In a case where the area in which the content C20 is displayed is selected, the change unit 156 changes the displayed area of the content C30 while reproducing the content C30. More specifically, the change unit 156 enlarges the width of the area of the content C30 that is displayed inside the screen while the area in which the content C20 is displayed is continued to be selected. On the other hand, in a case where the user releases the selection, the change unit 156 reduces the area of the content C30 that is displayed inside the screen.

For example, the change unit 156 gradually moves the content C30 of which a part of the area is arranged outside the screen while the area in which the content C20 is displayed is continued to be selected, thereby gradually enlarging the area of the content C30 that is displayed inside the screen. Then, in a case where entire content C30 is arranged inside the screen, and the content C30 is moved up to a position at which the content C20 and the content C30 do not overlap each other, the change unit 156 fixes the position of the content C30.

In addition, in a case where the selection of the content C20 is released, the change unit 156 gradually moves the content C30 in the downward direction on the screen and moves a part of the area of the content C30 to the outside of the screen, thereby reducing the area of the content C30 that is displayed inside the screen. Then, in a case where the entire area of the content C30 that is displayed inside screen is arranged on the back face of the content C20, the change unit 156 ends the movement of the content C30. For example, the change unit 156 moves the content C30 until the area of the content C30 that is displayed inside the screen is the same as the display size of the content C20.

In addition, in the initial state, in a case where the content C20 is arranged at the lower end of the screen, and the upper end of the content C20 and the upper end of the content C30 are arranged to be aligned, the change unit 156 may move the content C30 to the screen information by a distance that is the same as the vertical display size of the content C30. In other words, the change unit 156 may display the entire content C30 not to overlap the content C20 by specifying a movement distance of the content C30 in accordance with the display sizes of the content items C20 and C30 and the arrangement positions of the content items C20 and C30 and moving the content C30 by the specified distance.

In addition, the change unit 156 realizes the above-described display changing process by controlling the display unit 154. In addition, the reproduction of the moving image of the content C30 is controlled by the reproduction unit 155. For this reason, the display unit 154 changes the area displayed inside the screen while reproducing the moving image of the content C30.

7. Variation of Display Changing Process

In the description presented above, an example of the display changing process executed by the terminal apparatus 100 has been described by using the display form illustrated in FIG. 1. However, the embodiment is not limited thereto. Hereinafter, variations of the display changing process executed by the terminal apparatus 100 will be described. While the display changing process described below, for example, is realized by the display unit 154 executing various display operations under the control of the change unit 156, the embodiment is not limited thereto. In addition, hereinafter, while the process controlling the moving image of the content C30, for example, is realized by the reproduction unit 155, such a process may be realized by the change unit 156.

7-1. Form at Time of Changing Area Displayed Inside Screen

The terminal apparatus 100 described above changes the area of the content C30 that is displayed inside the screen with the display position of the content C20 being fixed. However, the embodiment is not limited thereto. The terminal apparatus 100 may arrange the content C20 and the content C30 on the upper side on the screen. In such a case, the terminal apparatus 100 arranges and displays the lower-side area of the content C30 on the back face of the content C20.

In addition, the terminal apparatus 100 may move the content C20 in accordance with the movement of the content C30. More specifically, in a case where the area in which the content C20 is displayed is selected by the user, the terminal apparatus 100 moves the content C20 and the content C30 in the upward direction on the screen. In other words, the terminal apparatus 100 enlarges the area of the content C30 that is displayed inside the screen without changing the area in which the content C20 and the content C30 overlap each other.

Then, in a case where entire content C30 is arranged inside the screen, the terminal apparatus 100 fixes the position of the content C30 and continues to move the content C20 in the upward direction on the screen. Then, in a case where the content C20 and the content C30 do not overlap each other, the terminal apparatus 100 fixes the position of the content C20. In other words, the terminal apparatus 100 moves the content C20 while reducing the area in which the content C20 and the content C30 overlap each other.

As a result, for example, a complicated form can be realized in which the terminal apparatus 100 moves the content C20 and the content C30 until the entire content C30 is displayed and, in a case where the entire content C30 is displayed, fixes the content C30 and moves only the content C20 until the content C20 and the content C30 do not overlap each other. For this reason, the terminal apparatus 100 can impress the user with information relating to the content items C20 and C30.

In addition, in a case where the user's selection is released, the terminal apparatus 100 moves the content C20 in the downward direction on the screen with the content C30 being fixed. Then, in a case where the area in which the content C20 and the content C30 overlap each other is the same as the display size of the content C20, the terminal apparatus 100 may move the content C20 and the content C30 in the downward direction on the screen up to that of the initial state.

7-2. User's Operation

The terminal apparatus 100 described above enlarges the displayed area of the content C30 while the area in which the content C20 is displayed is selected by the user. However, the embodiment is not limited thereto.

For example, in a case where the user taps on the area in which the content C20 is displayed, the terminal apparatus 100 may enlarge the displayed area of the content C30 until the entire content C30 is displayed. In addition, in a case where the user taps on the area in which the content C20 is displayed again, the terminal apparatus 100 may reduce the displayed area of the content C30 up to that of the initial state.

Furthermore, the terminal apparatus 100 may change the area of the content C30 that is displayed inside the screen by moving the content C30 in accordance with a movement operation. For example, in a case where the user selects the area in which the content C20 is displayed and directly executes a movement operation moving the selected position, the terminal apparatus 100 may enlarge or reduce the area of the content C30 that is displayed inside the screen by moving the content C30 in the direction of the movement. In a case where such a process is executed, the terminal apparatus 100, for example, can display the content items C20 and C30 in a complicated form in which a moving image hidden on the back face of the content C20 is started to be dragged out while reproducing the moving image.

In addition, in a case where the content C20 and the content C30 are moved until the entire content C30 is displayed in accordance with a movement operation, and the entire content C30 is displayed, the terminal apparatus 100 may fix the content C30 and move only the content C20 until the content C20 and the content C30 do not overlap each other. Hereinafter, an example of such a display changing process will be described with reference to FIG. 7.

Figure 7:
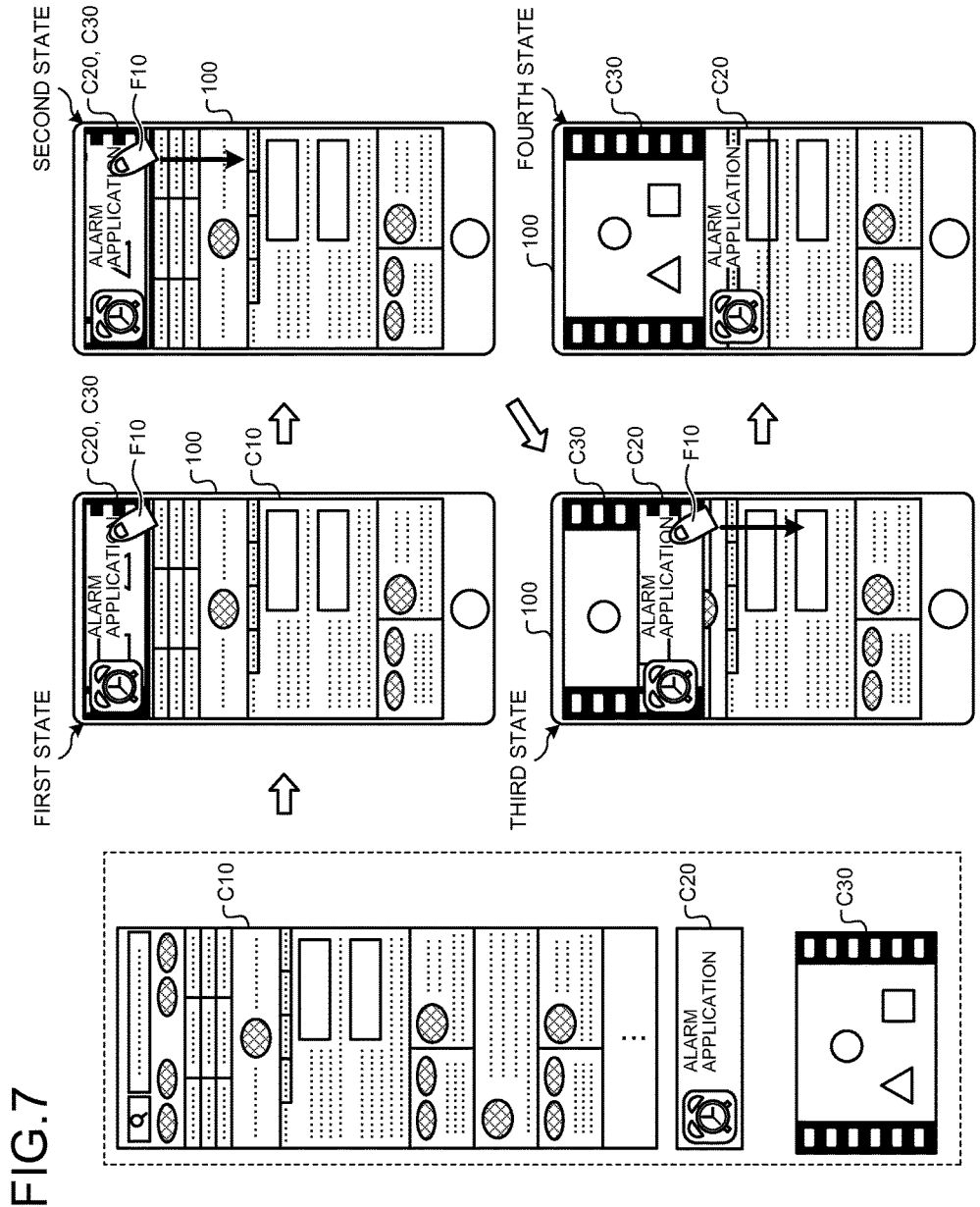
FIG. 7 is a diagram that illustrates variations of a display changing process executed by a terminal apparatus according to an embodiment.

FIG. 7 is a diagram that illustrates variations of the display changing process executed by the terminal apparatus according to an embodiment. For example, in the example illustrated in FIG. 7, the terminal apparatus 100 receives distribution of the web page C10 and the content items C20 and C30. In such a case, the terminal apparatus 100, as illustrated in the first state represented in FIG. 7, arranges the content C20 at the upper end of the screen, arranges a part of the content C30 on the back face of the content C20, and arranges and displays the web page C10 on the back faces of the content items C20 and C30.

Here, as illustrated in the second state represented in FIG. 7, in a case where the area in which the content C20 is displayed is selected by using the user's finger F10, and thereafter, the finger F10 is moved in the downward direction without being separated from the screen, in other words, in a case where a movement operation is executed, the terminal apparatus 100 executes the display changing process as below according to such a movement operation. First, as illustrated in the third state represented in FIG. 7, the terminal apparatus 100 moves the content C20 and the content C30 in the downward direction on the screen in accordance with the movement operation while reproducing the content C30.

Then, in a case where the entire content C30 is arranged inside the screen, the terminal apparatus 100 fixes the position of the content C30. In addition, in a case where the movement operation is further executed, the terminal apparatus 100 moves the content C20 in accordance with the movement operation. As a result, as illustrated in the fourth state represented in FIG. 7, the terminal apparatus 100 displays the content C20 and the content C30 not to overlap each other on the front face of the content C10.

As above, the terminal apparatus 100 changes the area of the content C30 that is displayed inside the screen by moving the content C20 and the content C30 in accordance with the user's movement operation. More specifically, the terminal apparatus 100 changes the area of the content C30 that is displayed inside the screen by moving the content C20 without changing the area in which the content C20 and the content C30 overlap each other. Then, in a case where a movement operation of a predetermined threshold or more is executed, for example, in a case where the entire content C30 is arranged inside the screen, the terminal apparatus 100 moves only the content C20 while reducing the area in which the content C20 and the content C30 overlap each other.

For this reason, the terminal apparatus 100 can realize a complicated form in which, in a case where the content C20 and the content C30 are pulled out in accordance with a user's movement operation, and the entire content C30 is displayed, only the content C20 is moved until the content C20 and the content C30 do not overlap each other. For this reason, the terminal apparatus 100 can impress the user with information relating to the content items C20 and C30.

7-3. Control of Reproduction Speed

In the example described above, the terminal apparatus 100 changes the area of the content C30 that is displayed inside the screen while reproducing the content C30. Here, the terminal apparatus 100 may change the reproduction speed of the content C30 in accordance with the area of the content C30 that is displayed inside the screen. For example, in a case where the area of the content C30 that is displayed inside the screen is not changed, in other words, in a case where such an area is the same as the display size of the content C20, the terminal apparatus 100 reproduces the content C30 at a reproduction speed lower than a predetermined reproduction speed. Then, the terminal apparatus 100 may allow the reproduction speed of the content C30 to approach the predetermined reproduction speed as the area of the content C30 that is displayed inside the screen is enlarged.

Figure 8:
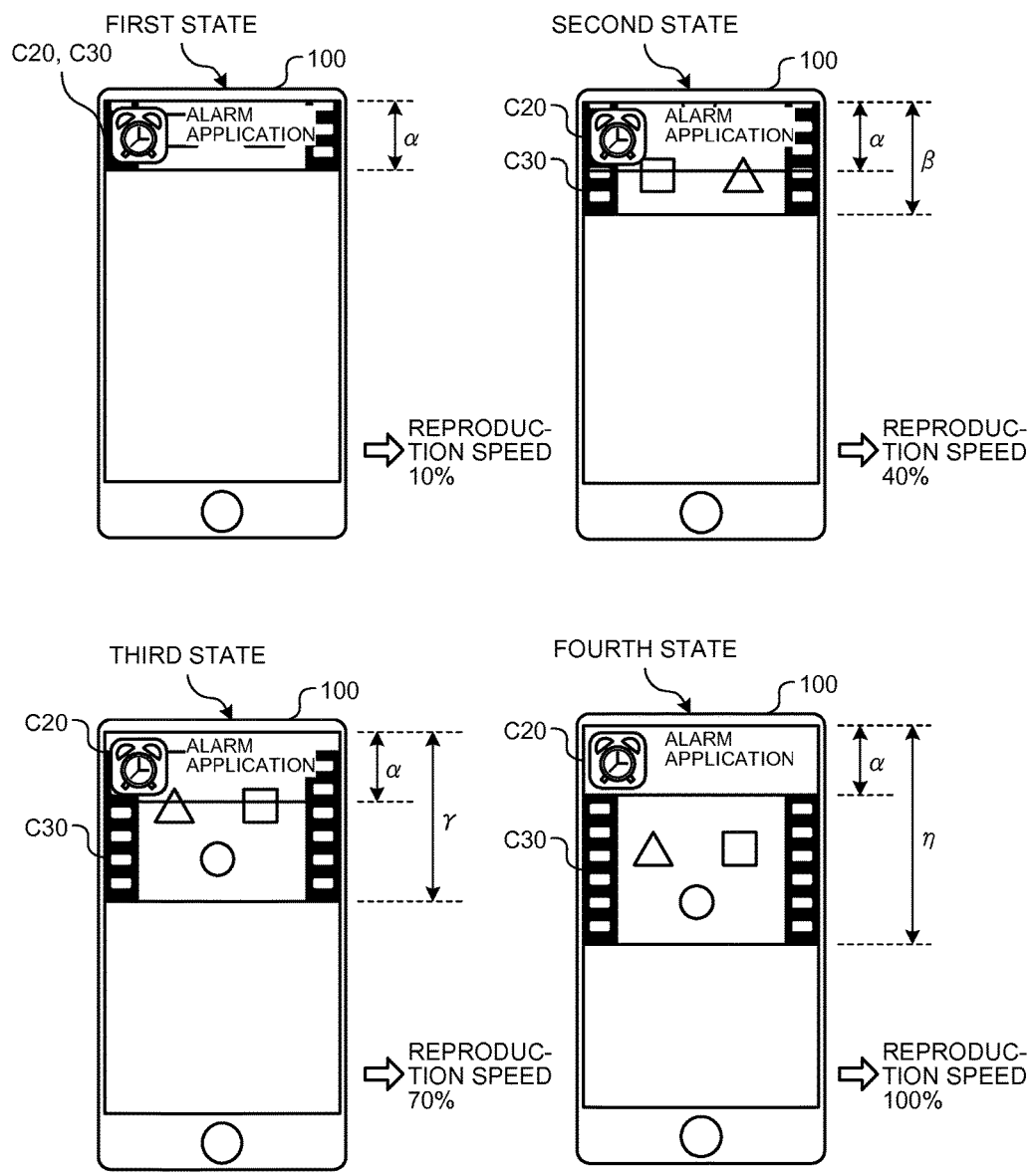
FIG. 8 is a diagram that illustrates an example of the process of changing the reproduction speed of a moving image that is executed by a terminal apparatus according to an embodiment.

Hereinafter, an example of the process of changing the reproduction speed of the content C30, which is executed by the terminal apparatus 100, in accordance with the area of the content C30 displayed inside the screen will be described with reference to FIG. 8. FIG. 8 is a diagram that illustrates an example of the process of changing the reproduction speed of a moving image that is executed by the terminal apparatus according to an embodiment. In description presented below, an example of the process of changing the reproduction speed with the reproduction speed set to the moving image of the content C30 being as "100%" will be described. In description presented below, the vertical display size of the content C20 will be denoted by "α".

For example, as illustrated in the first state represented in FIG. 8, in a case where the area of the content C30 that is displayed inside the screen is the same as the area of the content C20, the terminal apparatus 100 sets the reproduction speed of the content C30 as "10%" and reproduces the content. In other words, the terminal apparatus 100 reproduces the content C30 at the speed of 1/10 of the predetermined reproduction speed.

In addition, as illustrated in a second state represented in FIG. 8, in a case where a distance from the upper end of the screen to the lower end of the content C30 is "β" that is longer than "α", the terminal apparatus 100 sets the reproduction speed of the content C30 to "40%" and reproduces the content. More specifically, in a case where the length of "δ−α" is "40%" of the vertical display size of the content C30, the terminal apparatus 100 sets the reproduction speed of the content C30 to "40%".

Furthermore, as illustrated in a third state represented in FIG. 8, in a case where a distance from the upper end of the screen to the lower end of the content C30 is "γ" that is longer than "β", the terminal apparatus 100 sets the reproduction speed of the content C30 to "70%" and reproduces the content. More specifically, in a case where the length of "γ−α" is "70%" of the vertical display size of the content C30, the terminal apparatus 100 sets the reproduction speed of the content C30 to "70%".

In addition, as illustrated in a fourth state represented in FIG. 8, in a case where a distance from the upper end of the screen to the lower end of the content C30 is "η" that is longer than "γ", the terminal apparatus 100 sets the reproduction speed of the content C30 to "100%" and reproduces the content. More specifically, in a case where the length of "η−α" is the same as the vertical display size of the content C30, in other words, in a case where the entire content C30 is displayed inside the screen without overlapping the content C20, the terminal apparatus 100 sets the reproduction speed of the content C30 to "100%".

In addition, the terminal apparatus 100 may set the reproduction speed of the content C30 to any one of the reproduction speeds of four kinds illustrated in FIG. 8 or may change the reproduction speed more finely. For example, the terminal apparatus 100 may change the reproduction speed of the content C30 in units of 1% or in units of 10% in accordance with the area of the content C30 that is displayed inside the screen, in other words, a distance by which the content C30 is moved.

Furthermore, the terminal apparatus 100 may change the reproduction speed of the content C30 based on the area of the content C30 that is displayed inside the screen, the area of the range of such an area not overlapping the content C20, the amount of movement of the content C30, a time elapsed after a user's operation, the amount of a user's operation, or the like.

7-4. Arrangement Positions of Content Items C20 and C30

In the example described above, the terminal apparatus 100 arranges the content items C20 and C30 on the front face of the web page C10. In addition, the terminal apparatus 100 arranges the content items C20 and C30 at the lower end or the upper end of the screen. However, the embodiment is not limited thereto. For example, the terminal apparatus 100 may arrange the content items C20 and C30 at the right end or the left end of the screen.

In addition, the terminal apparatus 100 arranges the content C20 of which the horizontal width of the display size is shorter than the horizontal width of the screen at any one of four corners on the screen and displays the area of the content C30 having the same display size as that of the content C20 to overlap the content C20. Then, in a case where the content C20 is selected, the terminal apparatus 100 may enlarge the area of the content C30 that is displayed inside the screen by obliquely moving the content C30 (for example, toward the center of the screen).

For example, the terminal apparatus 100 arranges the content C20 having a square shape at the lower left corner of the screen and displays an area of the content C30 that is located on the upper right side and has the same display size as that of the content C20 to overlap the content C20 inside the screen. Then, in a case where the content C20 is selected by the user, the terminal apparatus 100 may enlarge the area of the content C30 that is displayed inside the screen in a form like displaying the content C30 from the lower left side by moving the content C30 to the upper right side of the screen.

In addition, for example, the terminal apparatus 100 may display the content items C20 and C30 as so-called in-line banners. More specifically, the terminal apparatus 100 arranges the content C20 and an area of the content C30 that has the same display size as that of the content C20 to overlap each other inside a predetermined area included in the web page C10. In addition, in a case where an operation of scrolling the web page C10 is executed, the terminal apparatus 100 scrolls the web page C10 and the content items C20 and C30.

Then, in a case where the content C20 is selected, the terminal apparatus 100 may gradually enlarge the area of the content C30 that is displayed inside the screen. In addition, together with the enlargement of the area of the content C30 that is displayed inside the screen or after the display of the entire content C30 inside the screen, the terminal apparatus 100 may display the entire content C30 not to overlap the content C20 by moving the content C30.

7-5. Change of Content C20 According to Reproduction State of Moving Image

In the example described above, the terminal apparatus 100 displays the content items C20 and C30 relating to each other. Here, the terminal apparatus 100 may impress the user more strongly with the information relating to the content items C20 and C30 by emphasizing the relation between the content C20 and the content C30 by linking the information arranged in the content C20 and the content C30 with each other.

More specifically, the terminal apparatus 100 specifies a reproduction state of the content C30 together with the above-described display changing process. For example, the terminal apparatus 100 specifies information of the position of the content C30 that has been reproduced, how many times the content C30 has been reproduced, whether or not the area of the content C30 that is displayed inside the screen is enlarged, the position of the content C30 that has been reproduced in a state in which the entire content C30 is displayed, how many times the content is reproduced in the state in which the entire content C30 is displayed, and the like as the reproduction state of the content C30.

Then, the terminal apparatus 100 changes information arranged in the content C20 based on the reproduction state of the specified content C30. For example, in a case where the content C30 has been reproduced from the start to the end in the state in which the entire content C30 is displayed, the terminal apparatus 100 newly displays a sentence such as "Now, the alarm application is free!" or the like in the content C20.

Here, in a case where the user selects the icon of the content C20 before the display of the sentence such as "Now, the alarm application is free!", the terminal apparatus 100 displays a landing page from which the alarm application relating to the content C20 can be downloaded for a fee. On the other hand, in a case where the content C20 in which the sentence such as "Now, the alarm application is free!" is newly displayed is selected by the user, the terminal apparatus 100 displays a landing page from which the alarm application relating to the content C20 can be downloaded for free. In addition, in a case where a discount rate according to the reproduction state of the content C30 is displayed in the content C20, and the content C20 is selected by the user, the terminal apparatus 100 may display a landing page from which the alarm application can be purchased with the discount rate according to the reproduction state of the content C30.

In addition, the terminal apparatus 100 may further change an advertisement sentence on the content C20 or an icon based on the reproduction state of the content C30. For example, the terminal apparatus 100 arranges a sentence such as "Free after additionally reproducing the content twice!" on the content C20 in a case where the content C30 is reproduced once and arranges a sentence such as "Free after additionally reproducing the content once!" on the content C20 in a case where the content C30 is reproduced twice. Then, the terminal apparatus 100 may newly display a sentence such as "Now, the alarm application is free!" on the content C20 in a case where the content C30 is reproduced three times.

Furthermore, the terminal apparatus 100 may display the content C30 not relating to the content C20. For example, the terminal apparatus 100 may display the content C30 that is a moving image relating to an advertisement not relating to the content C20 and set a link for receiving another target other than an advertisement target relating to the content C30 to the content C20 in accordance with the reproduction state of the content C30.

In addition, the terminal apparatus 100 may specify the accumulation of the reproduction state of the content C30 for each user and change information to be displayed in the content C20 based on the specified accumulation of the reproduction state. For example, although the content C30 has been reproduced only once after the display of the web page C10, in a case where the content C30 has been reproduced twice together with the display of another web page or the like until the display of the web page C10, the terminal apparatus 100 may execute the above-described process by regarding the content C30 to have been reproduced three times.

In addition, the terminal apparatus 100 may specify the reproduction state of the content C30 based on various kinds of history information stored in the terminal apparatus 100 or may acquire the reproduction state of the content C30 from a log server that acquires and stores various logs from the terminal apparatus 100 or the like.

In this way, the terminal apparatus 100 changes information arranged in the content C20 based on the reproduction state of the content C30. For this reason, the terminal apparatus 100 can strongly impress the user with information relating to the content items C20 and C30.

For example, the terminal apparatus 100 can arouse user's interest in a moving image and provide a motivation for reading the moving image to the end. In addition, since it becomes easy to cause the user to read the moving image to the end, the terminal apparatus 100 can promote the recognition rate of advertisement targets relating to the content items C20 and C30 and the sales of the advertisement targets. As a detailed example, the terminal apparatus 100 improves the recognition rate of an alarm application relating to the content items C20 and C30, thereby promoting the installation thereof.

7-6. Conversion of Landing Page

In a case where an icon arranged in the content C20 or an image displayed after the reproduction of the content C30 is selected or the like, the terminal apparatus 100 described above displays a landing page set to the content items C20 and C30. However, the embodiment is not limited thereto.

For example, the terminal apparatus 100 may display a landing page that is different based on the operation executed by the user, the degree of display of the content C30 inside the screen, the range of the content C30 that has been reproduced, whether the content is reproduced from the start to the end in the state in which the entire content C30 is displayed, or the like. In addition, the terminal apparatus 100 may display a landing page that is different in accordance with the reproduction state of the content C30.

7-7. Movement Direction of Content C30

In the example described above, while the area of the content C30 that is displayed inside the screen is enlarged by moving the content C30 in the upward direction or the downward direction, the embodiment is not limited thereto. For example, the terminal apparatus 100 may change the area of the content C30 that is displayed inside the screen by moving the content C30 in a horizontal direction of the screen, an inclined direction, or the like.

In addition, for example, the terminal apparatus 100 may directly change the area of the content C30 that is displayed inside the screen, for example, by using a technology of an alpha channel or the like instead of moving the content C30. In addition, for example, the terminal apparatus 100 may enlarge the area of the content C30 that is displayed inside the screen by displaying an area arranged at the center of the content C30 inside the screen in the initial state and gradually broadening such an area.

7-8. Type of Content

The terminal apparatus 100 displays the content C30 that is a moving image. However, the embodiment is not limited thereto. For example, the terminal apparatus 100 may display the content C30 that including a moving image and an audio. In such a case, for example, the terminal apparatus 100 may start the reproduction of the audio when the area of the content C30 that is displayed inside the screen exceeds a predetermined threshold. In addition, the terminal apparatus 100 may change the volume of the content C30 in accordance with the area of the content C30 that is displayed inside the screen.

A detailed example will now be described. In the initial state, the terminal apparatus 100 reproduces the content C30 in a muting state and gradually increases the volume in accordance with enlargement of the area of the content C30 that is displayed inside the screen. Then, in a case where the entire content C30 is displayed inside the screen, the terminal apparatus 100 outputs the audio of the content C30 with a predetermined volume level. In such a case, when the entire content C30 is displayed inside the screen, the terminal apparatus 100 may reproduce the moving image and the audio of the content C30 from the start again.

7-9. Initial State

In the initial state, the terminal apparatus 100 displays the area of the content C30 that has the same display size as that of the content C20. However, the embodiment is not limited thereto. In other words, when a part of the content C30 that is a moving image is displayed, in the initial state, the terminal apparatus 100 may display an area of an arbitrary display size to overlap the content C20.

In addition, for example, in a case where the content C20 does not have the transmissive area, the terminal apparatus 100 may display a part of the content C30 on the periphery of the content C20 while reproducing it. Then, in a case where the content C20 is selected, the terminal apparatus 100 may enlarge the area of the content C30 that is displayed inside the screen. For example, in the initial state, the terminal apparatus 100 may display an area of the content C30 that is larger than the display size of the content C20 to overlap the content C20.

7-10. Trigger of Display Changing Process

The terminal apparatus 100 may execute the display changing process in accordance with an operation other than a selection operation and a movement operation. For example, the terminal apparatus 100 displays the content C20 in which an explanatory note of "Knock on it!" or the like is posted. Then, for example, in a case where a user's operation of knocking on the terminal apparatus 100 is detected by using the physical sensor 140, the terminal apparatus 100 may execute the above-described display changing process.

7-11 Others

The terminal apparatus 100 may execute the display changing process by appropriately combining arbitrary processes described above. Such a combination may be arbitrarily set by the advertiser when advertisement content is registered in the advertisement distribution server 20. Then, the advertisement distribution server 20 generates control information used for causing the terminal apparatus 100 to execute the combination of the processes set by the advertiser and distributes the generated control information to the terminal apparatus 100. As a result, the terminal apparatus 100 can combine and execute arbitrary processes described above in accordance with the advertiser's setting.

8. Process Flow of Terminal Apparatus

Figure 9:
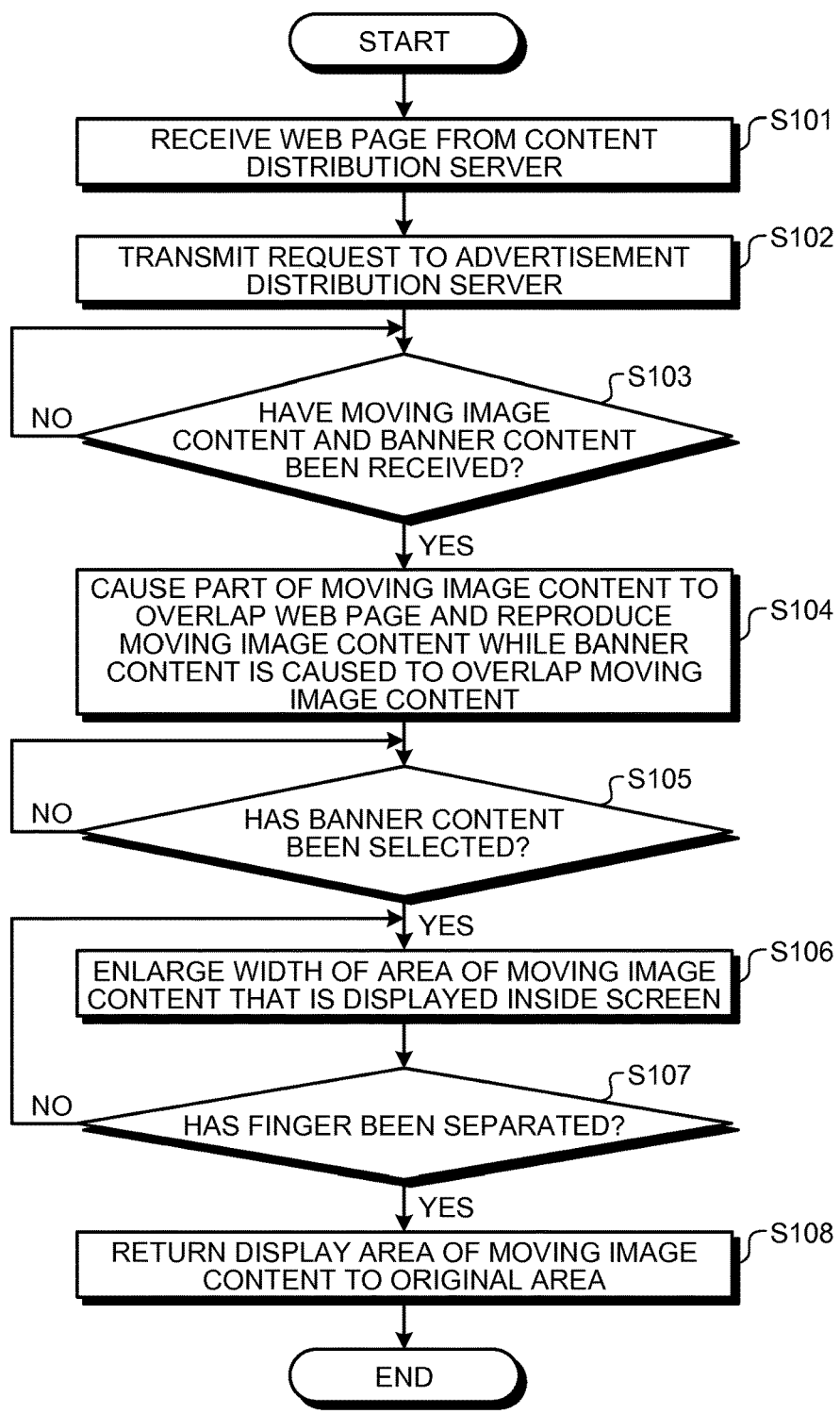
FIG. 9 is a flowchart that illustrates an example of the flow of a display changing process executed by a terminal apparatus according to an embodiment.

Next, the sequence of the process executed by the terminal apparatus 100 executing the control information will be described with reference to FIG. 9. FIG. 9 is a flowchart that illustrates an example of the flow of the display changing process executed by the terminal apparatus according to an embodiment. In description presented below, the content C20 will be described as a banner content, and the content C30 will be described as moving image content.

In the example illustrated in FIG. 9, the terminal apparatus 100 requests the content distribution server 30 to distribute the web page C10 in accordance with a user's operation and receives the web page C10 from the content distribution server 30 (Step S101). Next, in a case where an acquisition command is included in the distributed web page C10, the terminal apparatus 100 transmits a request to the advertisement distribution server 20 (Step S102). Next, the terminal apparatus 100 determines whether or not a moving image content and banner content have been received (Step S103). Then, in a case where the moving image content and the banner content are determined not to have been received (No in Step S103), the terminal apparatus 100 executes Step S103 again.

On the other hand, in a case where the moving image content and the banner content have been received (Yes in Step S103), the terminal apparatus 100 causes a part of the moving image content to overlap the web page C10 and causes the banner content to overlap the moving image content, and reproduces the moving image content (Step S104). In addition, the terminal apparatus 100 determines whether or not the banner content has been selected (Step S105). In a case where the banner content has been selected (Yes in Step S105), the terminal apparatus 100 enlarges the area of the moving image content that is displayed inside the screen in accordance with an operation (Step S106). In addition, the terminal apparatus 100 determines whether or not a finger has been separated from the screen (Step S107). In a case where the finger is separated from the screen (Yes in Step S107), the terminal apparatus 100 returns the area of the moving image content that is displayed inside the screen to the original size (Step S108), and the process ends.

On the other hand, in a case where the finger is not separated from the screen (No in Step S107), the terminal apparatus 100 executes Step S106 again. In addition, in a case where the banner content has not been selected (No in Step S105), the terminal apparatus 100 executes the process of Step S105.

9. Modified Example

In the description presented above, an example of the display changing process executed by the terminal apparatus 100 has been described by using the display form illustrated in FIG. 1. However, the embodiment is not limited thereto. Hereinafter, variations of the display changing process executed by the terminal apparatus 100 will be described. The display changing process described below is realized, for example, by controlling the display unit 154 using the change unit 156.

9-1. Type of Content

The terminal apparatus 100 described above displays the content items C20 and C30 relating to advertisements registered by the advertiser as the content items C20 and C30. However, the embodiment is not limited thereto, but the terminal apparatus 100 can apply the display changing process to arbitrary content. For example, the terminal apparatus 100 can apply the display changing process described above to arbitrary content, for example, a game, a web page receiving a user's operation, or the like other than the advertisement. As a more specific example, the terminal apparatus 100 may execute the display changing process for arbitrary content that is displayed, for example, when a game is executed or when a web page of an interactive form generated according to the description of flash, cascading style sheets (CSS), or the like is displayed.

By executing such a process, the terminal apparatus 100, for example, displays a part of the moving image hidden on the back face of another content while reproducing it, thereby arousing user's interest in the hidden content. Thereafter, by enlarging the display range of the hidden moving image in accordance with a user's operation such as a selection operation or a movement operation, the user having interest in the hidden moving image can be impressed with information to be delivered to the user by the hidden moving image.

9-2. Log

Here, the terminal apparatus 100 may take a log of an actually-displayed content or content selected by the user. For example, in a case where the display of the web page C10 ends with no user's selection of the content C20, the terminal apparatus 100 acquires a log indicating that only the content C20 has been read, but the content C30 has not been read. On the other hand, in a case where the user selects the content C20, and the area of the content C30 that is displayed inside the screen is enlarged, the terminal apparatus 100 acquires a log indicating that the content items C20 and C30 have been read. In addition, in a case where the entire content C30 is displayed on the screen, the terminal apparatus 100 acquires a log indicating that the entire content C30 has been read.

The log acquired by the terminal apparatus 100 in this way becomes a log that is useful at the time of update of the number of impressions or the CTR of each advertisement content, at the time of reporting advertisement effects to the advertiser, or the like. In addition, the terminal apparatus 100 may change the reward per impression between a case where the content C30 is read and a case where the entire content C30 is read.

In addition, the log acquired by the terminal apparatus 100 may be used for changing the content to be arranged on a landing page. For example, the terminal apparatus 100 acquires the same landing page and notifies a server, to which such a landing page is distributed, of information relating to whether or not the content C20 has been selected, whether or not an area of the content C30 that is displayed inside the screen has been enlarged, whether or not the entire content C30 has been displayed inside the screen, and the like. In such a case, the server distributing the landing page may specify content to be arranged on the landing page in accordance with the received information and instruct the terminal apparatus 100 to arrange the specified content on the landing page.

9-3. Control Information

The terminal apparatus 100 executes the display process described above by using the control information that is distributed by the advertisement distribution server 20 together with the content items C20 and C30. However, the embodiment is not limited thereto. For example, the terminal apparatus 100 receives the control information described above from the content distribution server 30 together with the web page and receives the display instruction from the advertisement distribution server 20 together with the content items C20 and C30. Then, the terminal apparatus 100 may change the display form of the advertisement content in accordance with the received display instruction together with executing the control information received from the content distribution server 30.

In addition, the terminal apparatus 100 may realize the process described above by downloading an application causing the terminal apparatus 100 to execute the process of displaying the web page C10, the above-described display changing process, and the like in advance and executing such an application.

9-4. Configuration of Apparatus

In the embodiment described above, while an example has been illustrated in which the advertisement distribution server 20 and the content distribution server 30 are included in the advertisement distribution system 1, the advertisement distribution server 20 and the content distribution server 30 may be formed as one apparatus. In such a case, the advertisement distribution server 20 illustrated in FIG. 3, for example, includes the content storage unit 32, the reception unit 34, and the distribution unit 35 illustrated in FIG. 5. Then, in a case where a request for acquiring a web page is received from the terminal apparatus 100, the advertisement distribution server 20 distributes the web page not including any acquisition command to the terminal apparatus 100 together with the advertisement content.

In addition, in the embodiment described above, while an example has been illustrated in which the content C20 is distributed from the advertisement distribution server 20 to the terminal apparatus 100, the content distribution server 30 may acquire the content items C20 and C30 from the advertisement distribution server 20. In such a case, the request reception unit 26 of the advertisement distribution server 20 acquires a request for acquiring the content items C20 and C30 from the content distribution server 30. In addition, the advertisement distribution server 20 distributes the content items C20 and C30 to the content distribution server 30. In addition, the content distribution server 30 distributes a web page not including any acquisition command to the terminal apparatus 100 together with the content items C20 and C30 acquired from the advertisement distribution server 20.

9-5. Operation Record of Terminal Apparatus

In addition, the terminal apparatus 100 described above may transmit a record relating to how much the user operates the terminal apparatus 100 for the web page on which the content items C20 and C30 according to the embodiment are displayed to the advertisement distribution server 20. More specifically, the terminal apparatus 100 records a scrolling operation executed by the user for the web page C10 on which the content items C20 and C30 are displayed, a selection operation and a movement operation for the content C20, and positions at which the user executes various operations, the number of times of execution of each operation, time at which each operation is performed, and the like.

In addition, the terminal apparatus 100 may record various operations, which are executed by the user for the terminal apparatus 100, such as a selection operation and a movement operation for the content C20, the number of times of reloading the web page C10, or an operation of transmitting information specifying the content C20 from the terminal apparatus (for example, a writing operation for an SNS). Then, the terminal apparatus 100 transmits information relating to the operation history to the advertisement distribution server 20.

In such a case, the advertisement distribution server 20 collects the information relating to the operation history distributed from the terminal apparatus 100 and further acquires analysis information of such information. For example, the advertisement distribution server 20 acquires comparison information of the number of times of executing the scrolling operation, the number of times of executing the movement operation, the number of times of executing the display changing process, the number of times of changing the area of the content C30 that is displayed inside the screen, the number of times of displaying the entire content C30, the type of displayed landing page and the type of content arranged on the landing page, the index of the advertisement effect such as the CTR, and the like between the web page C10 accompanying the control information according to the embodiment and a web page C10 not accompanying such control information.

Here, the operation history for the web page C10 on which the content items C20 and C30 accompanying the control information according to the embodiment are displayed can be index that represents the advertisement effect. In other words, on a web page on which the content items C20 and C30 accompanying the control information according to the embodiment are displayed, as the content items C20 and C30 are selected, not only a web page (landing page) of the destination of the content C20 is displayed, but the operation history relating to the number of operations executed by the user for such a web page C10 (for example, the number of times of executing the movement operation executed by the user so as to change the display form of the screen) can be regarded as an index representing the user's interest in the content items C20 and C30.

For example, by comparing the numbers of times of enlarging the area of the content C30 that is displayed inside the screen and times during which the area is enlarged, the numbers of times of arranging the entire content C30 inside the screen and times during which the entire content C30 is arranged inside the screen, the numbers of times of reproducing the content C30, and the like according to user's selection of the content C20 and execution of the display changing process, the advertisement distribution server 20 can provide an index representing the degree of caused interest in information to be broadly distributed by the content items C20 and C30, in other words, an advertisement at the time of displaying the content items C20 and C30 accompanying the control information according to the embodiment. Accordingly, by transmitting the information relating to the operation history of the terminal apparatus 100 to the advertiser terminal 10, the advertisement distribution server 20 can report the index of the advertisement effect for the web page C10 on which the content items C20 and C30 according to the embodiment are displayed. In addition, the advertisement distribution server 20 may directly transmit the information relating to the operation history of the terminal apparatus 100 to the advertiser terminal 10.

In this way, the advertisement distribution server 20 can represent the usefulness of the display form of the content C20 accompanying the control information according to the embodiment in the terminal apparatus 100 to the advertiser.

9-6. Others

Among the processes described in the embodiment described above, all or some of processes described to be automatically executed may be manually executed, or all or some of processes described to be manually executed may be automatically executed by using known methods. In addition, the processing sequence, specific names, and information including various kinds of data and parameters illustrated in the description presented above or the drawings may be arbitrarily changed unless otherwise mentioned. For example, various kinds of information illustrated in each drawing are not limited to the information illustrated in the drawing.

In addition, each constituent element of each apparatus that has been illustrated is in a functional and conceptual sense and does not necessarily need to be physically configured as illustrated. In other words, a specific form of separation/integration of each apparatus is not limited to that illustrated in the drawings, and all or some thereof may be configured to be functionally or physically separated or integrated in an arbitrary unit based on various loads, the use conditions, and the like. For example, the request unit 151 and the operation control unit 152 illustrated in FIG. 6 may be integrated together. In addition, by executing the process executed by the reproduction unit 155 by using the display unit 154 or the change unit 156, the above-described display changing process may be realized.

Furthermore, the embodiments described above may be appropriately combined in a range in which the processing contents are not contradictory to each other.

9-7. Program

Figure 10:
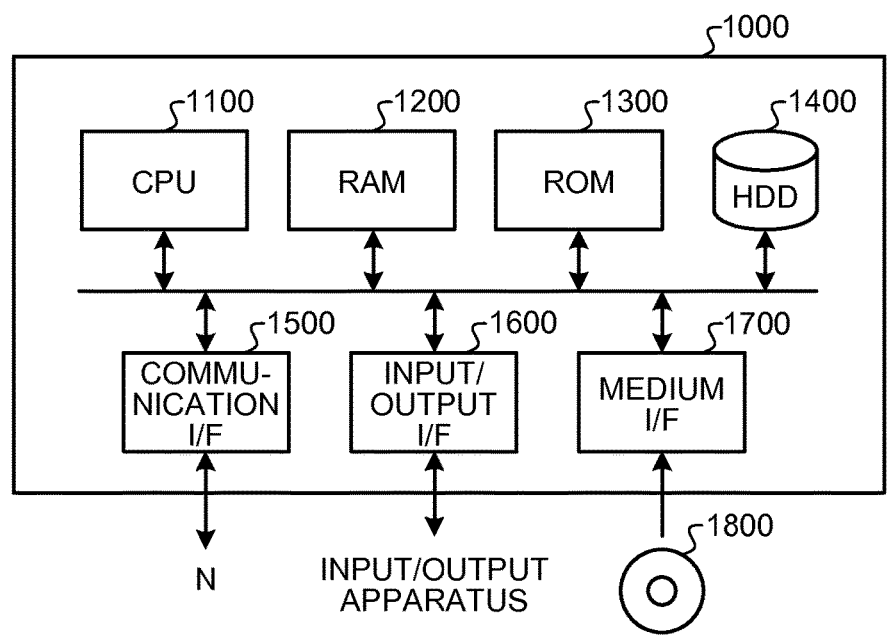
FIG. 10 is a hardware configuration diagram that illustrates an example of a computer realizing the function of an advertisement distribution server.

Each of the terminal apparatus 100, the advertisement distribution server 20, and the content distribution server 30 according to the embodiment described above is realized, for example, by a computer 1000 having a configuration as illustrated in FIG. 10. Hereinafter, a case of the advertisement distribution server 20 will be described as an example. FIG. 10 is a hardware configuration diagram that illustrates an example of a computer realizing the function of the advertisement distribution server. The computer 1000 includes: a CPU 1100; RAM 1200; ROM 1300; an HDD 1400; a communication interface (I/F) 1500; an input/output interface (I/F) 1600; and a medium interface (I/F) 1700.

The CPU 1100 operates based on a program stored in the ROM 1300 or the HDD 1400, and thereby controlling each unit. The ROM 1300 stores a booting program executed by the CPU 1100 at the time of start-up of the computer 1000, a program depending on the hardware of the computer 1000, and the like.

The HDD 1400 stores a program executed by the CPU 1100, data used by a related program, and the like. The communication interface 1500 receives data from other devices through a network N, transmits the received data to the CPU 1100, and transmits data generated by the CPU 1100 to the other devices.

The CPU 1100 controls output devices such as a display and a printer and input devices such as a keyboard and a mouse through the input/output interface 1600. The CPU 1100 acquires data from input device through the input/output interface 1600. In addition, the CPU 1100 outputs generated data to the output devices through the input/output interface 1600.

The medium interface 1700 reads a program or data stored on a recording medium 1800 and provides the read program or data for the CPU 1100 through the RAM 1200. The CPU 1100 loads the related program on the RAM 1200 from the recording medium 1800 through the medium interface 1700 and executes the loaded program. The recording medium 1800, for example, is an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 serves as the advertisement distribution server 20 according to the embodiment, the CPU 1100 of the computer 1000 executes a program loaded on the RAM 1200, thereby realizing the function of the control unit 23. In addition, in the HDD 1400, data of the inside of the storage unit 22, in other words, the advertisement database 24 is stored. While the CPU 1100 of the computer 1000 reads the program from the recording medium 1800 and executes the read program, as another example, such a program may be acquired from another device.

In addition, in a case where the computer 1000 serves as the terminal apparatus 100 according to the embodiment, the CPU 1100 of the computer 1000 executes a program loaded on the RAM 1200, thereby realizing the function of the control unit 150.

In addition, in a case where the computer 1000 serves as the content distribution server 30 according to the embodiment, the CPU 1100 of the computer 1000 executes a program loaded on the RAM 1200, thereby realizing the function of the control unit 33. In the HDD 1400, data of the inside of the content storage unit 32 is stored.

10. Advantages

As described above, the terminal apparatus 100 displays the content C20 and a part of the content C30 that is a moving image to overlap each other. Then, in a case where the area in which the content C20 is displayed is selected by the user, the terminal apparatus 100 changes the area of the content C30 that is displayed inside the screen while reproducing the content C30.

For this reason, the terminal apparatus 100 can arouse user's interest in information relating to the content items C20 and C30, and accordingly, the appeal of the information relating to the content items C20 and C30 can be improved. For example, the terminal apparatus 100 arranges a part of the content C30 that is a moving image on the back face of the content C20. Then, when a user interested in the content C20 selects the content C20, the terminal apparatus 100 displays the content C30 in a form in which the area of the content C30 that is displayed inside the screen is gradually enlarged while reproducing the content C30.

As a result, since the terminal apparatus 100 can impress the user with the content items C20 and C30, the appeal of the information relating to the content items C20 and C30 can be improved. In addition, since the terminal apparatus 100 displays not only the content C20 that is an image or the like but also the content C30 that is a moving image, the terminal apparatus 100 can impress the user with much information.

As a more specific example, in a case where advertisement content relating to an advertisement are displayed as the content items C20 and C30, the terminal apparatus 100 can arouse user's interest in the advertisement content, and accordingly, the appeal of the information to be transmitted by the advertisement content is improved, whereby the advertisement effect can be improved.

In addition, the terminal apparatus 100 arranges and displays a part of the content C30 on the back face of the content C20 including the transmissive area. For this reason, for example, the terminal apparatus 100 can display the content items C20 and C30 in a complicated form in which the semi-transparent content C20 is displayed to overlap the content C30. As a result, the terminal apparatus 100 can impress the user with the content items C20 and C30.

Furthermore, the terminal apparatus 100 enlarges the area of the content C30 that is displayed inside the screen while the area in which the content C20 is displayed is continued to be selected by the user. For this reason, the terminal apparatus 100 can impress the user with the content items C20 and C30.

In addition, in the initial state, the terminal apparatus 100 displays an area of the content C30 that has the same display size as the area in which the content C20 is displayed inside the screen and, in a case where the selection is released by the user, returns the area of the content C30 that is displayed inside the screen to a display size that is the same as that of the area in which the content C20 is displayed. For this reason, since the terminal apparatus 100 returns the display form of the content items C20 and C30 to the original form when the user releases the selection, for example, the web page C10 is not blocked to be read, and accordingly, the degradation of the impression of the content items C20 and C30 can be prevented.

In addition, the terminal apparatus 100 moves the content C20 according to an operation of moving the area in which the content C20 is displayed and changes the area of the content C30 that is displayed inside the screen. For this reason, for example, the terminal apparatus 100 can display the content items C20 and C30 in a complicated form in which the content C30 hidden on the back face of the content C20 appears in accordance with the movement operation.

Furthermore, the terminal apparatus 100 moves the content C20 without changing the area in which the content C20 and the content C30 overlap each other and changes the area of the content C30 that is displayed inside the screen. For this reason, for example, the terminal apparatus 100 can display the content items C20 and C30 in a complicated form in which the content C20 and the content C30 hidden on the back face of the content C20 appear in accordance with the movement operation.

In addition, in a case where the operation of moving the content C20 is executed for a predetermined threshold or more, the terminal apparatus 100 moves the content C20 while reducing the area in which the content C20 and the content C30 overlap each other. For this reason, the terminal apparatus 100 can display the entire content C30 inside the screen without causing the content C30 to overlap the content C20.

As a result of each process described above, the terminal apparatus 100 can impress the user with the information relating to the content items C20 and C30.

In addition, the terminal apparatus 100 changes the reproduction speed of the content C30 in accordance with the area of the content C30 that is displayed inside the screen.

Described in more detail, in a case where the display size of the area in which the content C20 is displayed and the display size of the area of the content C30 that is displayed inside the screen coincide with each other, the terminal apparatus 100 reproduces the content C30 at a reproduction speed lower than a predetermined reproduction speed. Then, as the area of the content C30 that is displayed inside the screen is enlarged, the reproduction speed of the content C30 is caused to approach the predetermined reproduction speed.

As a result of the process described above, the terminal apparatus 100 displays the content C30 in a complicated form in which the reproduction speed is changed in accordance with the area of the content C30 that is displayed inside the screen, and accordingly, the user can be impressed with the information relating to the content C30.

In addition, the terminal apparatus 100 displays the content C20 and the content C30 in an overlapping manner while reproducing the content C30. For this reason, the terminal apparatus 100 can suggest the user that a moving image is hidden in the content C20, and accordingly, the user's interest in the content items C20 and C30 can be aroused.

Furthermore, the terminal apparatus 100 displays the content C20 including an icon that can transit to a predetermined landing page when the icon is selected by the user.

In addition, the terminal apparatus 100 displays the content C30 in which an image that can transit to a predetermined landing page when the image is selected by the user is displayed after the end of the reproduction.

As a result of the process described above, since the terminal apparatus 100, for example, displays a landing page that represents the information to be delivered by the content items C20 and C30 in detail, the appeal of the information to be delivered by the content items C20 and C30 can be improved.

In addition, the terminal apparatus 100 displays the content C20 in which information relating to the content C30 such as an explanatory note relating to the moving image of the content C30 is arranged and changes the information arranged in the content C20 in accordance with the reproduction state of the content C30. For this reason, the terminal apparatus 100 can strongly impress the user with the information relating to the content items C20 and C30.

As above, while several embodiments of the present application have been described in detail with reference to the drawings, these are merely examples, and the present invention can be implemented in other embodiments acquired by applying various modifications or improvements to the embodiments described in "Summary of the Invention" based on the knowledge of those skilled in the art.

In addition, the "unit (the section or the module)" described above may be rephrased by a "means", a "circuit", or the like. For example, the distribution unit may be rephrased by a distribution means or a distribution circuit.

According to one embodiment, there is an advantage of being capable of improving the appeal of information relating to content.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information display apparatus for use by a user, the information display apparatus comprising:
   a processor programmed to:
      display an entirety of a first content in a display area of the information display apparatus;
      display a part of a second content that is a moving image in the display area, the second content being arranged behind the first content; and
      increase an area of the second content not being concealed by the first content and displayed in the display area by moving the second content from behind the first content such that the first content and second content are displayed in a case where the first content in the display area is continuously selected by the user by holding the user's finger on the first content without moving in the display area.

2. The information display apparatus according to claim 1, wherein the processor arranges and displays a part of the second content on a back face of the first content including an area transmitting background.

3. The information display apparatus according to claim 1, wherein the processor enlarges the displayed area of the second content while the area in which the first content is displayed is continued to be selected by the user.

4. The information display apparatus according to claim 3,
   wherein the processor displays an area of the second content that has the same display size as that of the area in which the first content is displayed, and
   wherein the processor returns the displayed area of the second content to a display size that is the same as that of the area in which the first content is displayed in a case where the selection is released by the user.

5. The information display apparatus according to claim 1, wherein the processor moves the first content in accordance with an operation of moving the area in which the first content is displayed and changes the area in which the second content is displayed.

6. The information display apparatus according to claim 5, wherein the processor moves the first content without changing an area in which the first content and the second content overlap each other and changes the displayed area of the second content.

7. The information display apparatus according to claim 6, wherein the processor moves the first content while reducing the area in which the first content and the second content overlap each other in a case where an operation of moving the first content is executed for a predetermined threshold or more.

8. The information display apparatus according to claim 1, wherein the processor changes a reproduction speed of the second content in accordance with the displayed area of the second content.

9. The information display apparatus according to claim 1, wherein the processor displays the first content and the second content in an overlapping manner while reproducing the second content.

10. The information display apparatus according to claim 1, wherein the processor displays the first content including an area that can transit to predetermined content when the area is selected by the user.

11. The information display apparatus according to claim 1, wherein the processor displays the second content that displays an image that can transit to predetermined content when the image is selected by the user after end of the reproduction.

12. The information display apparatus according to claim 1,
wherein the processor displays the first content in which information relating to the second content is arranged, and
wherein the processor changes the information arranged in the first content in accordance with a reproduction state of the second content.

13. The information display apparatus according to claim 1, wherein
a first part of the second content that is the moving image is arranged in the display area, the first part of the second content being arranged behind the first content, and
a second part of the second content is arranged outside the display area.

14. An information display apparatus for use by a user, the information display apparatus comprising:
a processor programmed to:
display an entirety of a first content in a display area of the information display apparatus;
display a part of a second content that is a moving image in the display area, the second content being arranged behind the first content; and
increase an area of the second content displayed in the display area while reproducing the second content in a case where the first content in the display area is selected by the user, wherein:
the processor changes a reproduction speed of the second content in accordance with the displayed area of the second content, and
the processor reproduces the second content at a reproduction speed lower than a predetermined reproduction speed in a case where a display size of the area in which the first content is displayed and a display size of the displayed area of the second content coincide with each other and causes the reproduction speed of the second content to approach the predetermined reproduction speed as the displayed area of the second content is enlarged.

15. A distribution apparatus comprising:
a network interface; and
a processor programmed to:
distribute, over the network interface to a terminal apparatus, second content that is a moving image displayed together with first content and a control program, the control program when received by the terminal apparatus, causing the terminal apparatus to:
display an entirety of the first content in a display area of the terminal apparatus,
display a part of the second content in the display area, the second content being arranged behind the first content; and
increase an area of the second content not being concealed by the first content and displayed in the display area by moving the second content from behind the first content such that the first content and second content are displayed in a case where the first content in the display area is continuously selected by the user by holding the user's finger on the first content without moving in the display area.

16. The distribution apparatus according to claim 15, wherein
a first part of the second content that is the moving image is arranged in the display area, the first part of the second content being arranged behind the first content, and
a second part of the second content is arranged outside the display area.

17. An information display method for use with an information display apparatus and a user, the information display method comprising:
displaying an entirety of a first content in a display area of the information display apparatus;
displaying a part of a second content that is a moving image in the display area, the second content being arranged behind the first content; and
increasing an area of the second content not being concealed by the first content and displayed in the display area by moving the second content from behind the first content such that the first content and the second content are displayed in a case where the first content in the display area is continuously selected by the user by holding the user's finger on the first content without moving in the display area.

18. The information display method according to claim 17, wherein
a first part of the second content that is the moving image is arranged in the display area, the first part of the second content being arranged behind the first content, and
a second part of the second content is arranged outside the display area.

19. A non-transitory computer readable storage medium having stored therein a display program causing a computer to execute a process for use with an information display apparatus and a user, the process comprising:
displaying an entirety of a first content in a display area of the information display apparatus;
displaying a part of a second content that is a moving image in the display area, the second content being arranged behind the first content; and increasing an area of the second content not being concealed by the first content and displayed in the display area by moving the second content from behind the first content such that the first content and the second content are displayed in a case where the first content in the display area is continuously selected by the user by holding the user's finger on the first content without moving in the display area.

20. The non-transitory computer readable storage medium according to claim 19, wherein
a first part of the second content that is the moving image is arranged in the display area, the first part of the second content being arranged behind the first content, and
a second part of the second content is arranged outside the display area.

* * * * *